US012725378B2

(12) United States Patent
Chiosa et al.

(10) Patent No.: US 12,725,378 B2
(45) Date of Patent: Sep. 1, 2026

(54) ADJUSTING AN ARRANGEMENT OF THREE-DIMENSIONAL DIGITAL TOOTH MODELS

(71) Applicant: EXOCAD GMBH, Darmstadt (DE)

(72) Inventors: Iurie Chiosa, Weiterstadt (DE); Maik Gerth, Seeheim-Jugenheim (DE)

(73) Assignee: EXOCAD GMBH, Darmstadt (DE)

( * ) Notice: Subject to any disclaimer, the term of this patent is extended or adjusted under 35 U.S.C. 154(b) by 587 days.

(21) Appl. No.: 18/134,678

(22) Filed: Apr. 14, 2023

(65) Prior Publication Data

US 2024/0346788 A1 Oct. 17, 2024

(51) Int. Cl.

*G06T 19/20* (2011.01)
*A61C 13/00* (2006.01)
*A61C 13/34* (2006.01)

(52) U.S. Cl.

CPC .............. *G06T 19/20* (2013.01); *A61C 13/34* (2013.01); *A61C 13/0019* (2013.01); *G06T 2219/2004* (2013.01); *G06T 2219/2016* (2013.01); *G06T 2219/2021* (2013.01)

(58) Field of Classification Search

CPC ............. G06T 19/20; G06T 2219/2004; G06T 2219/2016; G06T 2219/2021; A61C 13/0019; A61C 13/34

See application file for complete search history.

(56) References Cited

U.S. PATENT DOCUMENTS

2016/0175068 A1* 6/2016 Cai ........................ A61C 7/002 700/98
2016/0242881 A1 8/2016 Fisker
2023/0035538 A1* 2/2023 Marshall .............. A61C 9/0053
2023/0132201 A1* 4/2023 Chekh .................... G16H 50/50 345/419

FOREIGN PATENT DOCUMENTS

WO WO-2013053903 A1 4/2013

* cited by examiner

*Primary Examiner* — Daniel F Hajnik
*Assistant Examiner* — Jed-Justin Imperial
(74) *Attorney, Agent, or Firm* — PERRY + CURRIER INC.

(57) ABSTRACT

Disclosed is a computer-implemented method for adjusting an arrangement of a plurality of three-dimensional digital tooth models for a dental restoration. A three-dimensional digital teeth model comprising the plurality of the three-dimensional digital tooth models is received. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and applying. Furthermore, adjustments of a set of remaining three-dimensional digital tooth models of the three-dimensional digital teeth model depending on the modification of the selected one or more three-dimensional digital tooth models are automatically calculated and applied. The resulting adjusted three-dimensional digital teeth model is provided for manufacturing the dental restoration.

27 Claims, 10 Drawing Sheets

ADJUSTING AN ARRANGEMENT OF THREE-DIMENSIONAL DIGITAL TOOTH MODELS

FIELD OF THE INVENTION

The invention relates to the field of dental technology. More particularly, the invention relates to a computer-implemented method for adjusting an arrangement of a plurality of three-dimensional digital tooth models for a-dental restoration. The invention furthermore relates to a computer device and a computer program product for adjusting an arrangement of a plurality of three-dimensional digital tooth models for a dental restoration as well as a manufacturing system for manufacturing the dental restoration.

BACKGROUND

In modern dental technology, computer-based approaches are used for configuring and manufacturing dental restorations. For example, an arrangement of a plurality of artificial teeth for the dental restoration may be generated and adjusted using a computer. Adjusting an arrangement of a plurality of artificial teeth for the dental restoration may be a challenging task.

It is an objective to provide for a method, a computer device and a computer program product for adjusting an arrangement of a plurality of three-dimensional digital tooth models for a dental restoration as well as for a manufacturing system for manufacturing the dental restoration. The objectives underlying the invention are solved by the features of the independent claims.

SUMMARY

In one aspect, a computer-implemented method is disclosed for adjusting an arrangement of a plurality of three-dimensional digital tooth models for a dental restoration. The method comprises receiving a three-dimensional digital teeth model comprising the plurality of the three-dimensional digital tooth models. The three-dimensional digital teeth model defines an arrangement of a plurality of artificial teeth for the dental restoration. Each of the three-dimensional digital tooth models defines an individual artificial tooth of the plurality of artificial teeth. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. Adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The resulting adjusted three-dimensional digital teeth model is provided for manufacturing the dental restoration.

A dental restoration, e.g., a partial denture or a complete denture, to be configured may, e.g., comprise a plurality of artificial teeth. For configuring a dental restoration, the three-dimensional digital teeth model may be provided comprising the plurality of three-dimensional digital tooth models descriptive of the geometric form and relative position of the artificial teeth to be comprised by the dental restoration. The three-dimensional digital teeth model, i.e., the arrangement of the plurality of three-dimensional digital tooth models descriptive of the artificial teeth to be comprised by the dental restoration, is adjusted to fit the model to the individual requirements of a patient.

For adjusting the three-dimensional digital teeth model, one or more of the three-dimensional digital tooth models may be selected and modified. The modification may, e.g., comprise a modification of a position and/or orientation of the selected one or more the three-dimensional digital tooth models. For this purpose, the modification may, e.g., comprise a lateral movement and/or a rotational movement. The modification may, e.g., comprise a modification of a size of the selected one or more the three-dimensional digital tooth models. For this purpose, the modification may, e.g., comprise a scaling. The modification may, e.g., comprise a modification of a geometric form of the selected one or more the three-dimensional digital tooth models.

For controlling the selection and the modification of the one or more selected three-dimensional digital tooth models an input device for providing a user input to a computer device executing the method may be used. The input device may, e.g., comprise a touchscreen, a gesture recognition device or a hand-held pointing device that detects two-dimensional or three-dimensional motions. For example, a hand-held pointing device configured for detecting two-dimensional motion relative to a surface, like a computer mouse, touchpad, a trackpoint, or a pen, may be used to control a graphical user interface of a computer and providing the respective input.

For example, the selecting of the one or more selected three-dimensional digital tooth models may comprise a mousedown event. A mousedown event refers to a selection and/or modification activation input, e.g., a pressing of a pointing device button, e.g., while a pointer is inside the one or more selected three-dimensional digital tooth models. Using movements detected via the input device, while the selection and/or modification is still active, e.g., the pointing device button being pressed, the modification of the one or more selected three-dimensional digital tooth models may be controlled. A completion of the modification may be indicated using a mouseup event. A mouseup event refers to a selection and/or modification deactivation input, e.g., a releasing of a pointing device button, e.g., while the pointer is inside the one or more selected three-dimensional digital tooth models.

For example, the selecting of the one or more selected three-dimensional digital tooth models may comprise a first click event on the three-dimensional digital tooth models to be selected, e.g., using a pressing and releasing of a pointing device button or recognition of a selection activation gesture, e.g., while a pointer is inside the one or more selected three-dimensional digital tooth models. This first click event refers to a selection and/or modification activation input. A completion of the modification may be indicated using a second click event. The second click event refers to a selection and/or modification deactivation input, e.g., using a pressing and releasing of a pointing device button or recognition of a selection deactivation gesture, e.g., while the pointer is inside the one or more selected three-dimensional digital tooth models.

The modification of the selected three-dimensional digital tooth models may be displayed on a display device with a frame rate, which is sufficiently high to give the user a real-time impression of the application of the modification onto the selected three-dimensional digital tooth models. A real-time impression refers to a displaying with a frame rate, such that the user has the impression of a smooth modification with no perceptive breaks. For example, the modification of the selected one or more three-dimensional digital tooth models may be updated, i.e., calculated and applied, with a rate of at least 20 frames per second, e.g., 20 to 30 frames per second. The rate could of course also be higher, like 40, 50, 60, 70, 80, 90 or 100 frames per second.

While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The automatic calculation and application of the adjustments of the geometric form of the selected one or more three-dimensional digital tooth models may, e.g., be executed at and displayed at the same rate as the modification of the selected three-dimensional digital tooth models. Thus, the user may be given a real-time impression of the adjustments.

By the automatically calculating and applying of adjustments to the individual geometric forms of the individual three-dimensional digital tooth models comprised by the selected one or more three-dimensional digital tooth models, it may be ensured that each of the one or more selected three-dimensional digital tooth models satisfies the one or more first geometric criteria.

The one or more first geometric criteria may, e.g., require for each of the selected three-dimensional digital tooth models an adaptation of the geometric form, i.e., the tooth shape, of the respective selected three-dimensional digital tooth model to an antagonist of the respective selected three-dimensional digital tooth model. When the selected three-dimensional digital tooth model is moved, scaled and/or deformed, the first geometric criteria may, e.g., require that the selected three-dimensional digital tooth model does not intersect with the antagonist and/or that an occlusal contact with the antagonist is maintained in occlusion. For this purpose, the geometric form of the three-dimensional digital tooth model may be automatically adjusted, e.g., cups of the occlusal surface of the selected three-dimensional digital tooth model may be morphed to maintain contact, e.g., adequate contact areas, with antagonist. Thereby, an instant anatomic morphing of the selected three-dimensional digital tooth model may be implemented. The occlusal surface of the selected three-dimensional digital tooth model is automatically adapted to the antagonist. As a user modifies the selected three-dimensional digital tooth model, the user may be provided with a real-time display of an automatic adaption of the anatomy of the tooth described by the selected three-dimensional digital tooth model to the antagonist with each step of the modification. The instant anatomic morphing automatically adjusts the occlusion.

For this purpose, e.g., a second three-dimensional digital teeth model of an opposite dental arch may be received comprising a plurality of three-dimensional digital tooth models of antagonists of the tooths described by the three-dimensional digital tooth models of the first three-dimensional digital teeth model. The second three-dimensional digital teeth model may, e.g., be arranged in static or dynamic occlusion relative to the first three-dimensional digital teeth model.

Furthermore, a minimum thickness of the selected three-dimensional digital tooth model may be automatically preserved. For this purpose as well, the geometric form of the selected three-dimensional digital tooth model may be automatically adjusted, while the selected three-dimensional digital tooth model is modified. For this purpose, three-dimensional digital models of prepared teeth or abutments may be provided, on which the artificial teeth described by the three-dimensional digital tooth models of the received three-dimensional digital teeth model are to be arranged. For example, these three-dimensional digital models of prepared teeth or abutments may be comprised by the received three-dimensional digital teeth model.

The minimum thickness may define a minimum thickness of restoration material required for manufacturing an artificial tooth using the three-dimensional digital tooth model as a template, in order to ensure one or more of the following: a sufficient minimum structural stability of the artificial tooth, a pre-defined color of the artificial tooth, a pre-defined degree of transparency of the artificial tooth. The minimum thickness may be a material depending thickness, i.e., the required minimum thickness may differ for different restoration materials.

For a set of remaining three-dimensional digital tooth models of the three-dimensional digital teeth model adjustments may be calculated and applied automatically depending on the modification of the selected three-dimensional digital tooth model. Thus, the remaining three-dimensional digital tooth models may be automatically adjusted to the modification of the selected one or more three-dimensional digital tooth models. The adjustments of geometric forms of the remaining three-dimensional digital tooth models may be calculated such that one or more second geometric criteria for the remaining three-dimensional digital tooth models are satisfied. Like the first criteria for the adjustments of the selected one or more three-dimensional digital tooth models, the second criteria for the adjustments of the remaining three-dimensional digital tooth models may implement an instant anatomic morphing of the remaining three-dimensional digital tooth model. Thus, all adjustments are executed such that occlusal surfaces of the remaining three-dimensional digital tooth models are automatically adapted to their antagonists, when the adjustment remaining three-dimensional digital tooth models, e.g., comprises a movement, scaling and/or deforming resulting in an alteration of the geometric relations of the remaining three-dimensional digital tooth models to their antagonists in occlusion. When a user modifies the selected one or more three-dimensional digital tooth models, the user may automatically be provided with adaptions of the anatomy of the remaining three-dimensional digital tooth models to their antagonists, when the remaining three-dimensional digital tooth models are adjusted due to the modification of the selected one or more three-dimensional digital tooth models.

Thereby, instant anatomic tooth morphing for more than one three-dimensional digital tooth model may be implemented. Using chain preserving first and second criteria for the adjustments, it may be ensured for any modification of the selected one or more three-dimensional digital tooth models, for any adjustments of the geometric form of the selected one or more three-dimensional digital tooth models as well as for any adjustments of the remaining three-dimensional digital tooth models, that the geometric form of any of the three-dimensional digital tooth models comprised by the three-dimensional digital teeth models remains correct with respect to its location within the dental arch as well as relative to the geometric forms of the other three-dimensional digital tooth models. Thereby, it may be ensured that the three-dimensional digital tooth models of the adjusted three-dimensional digital teeth model fit to the patient's dentition and/or jaw.

Thus, a dental arch resembled by the three-dimensional digital teeth model may be kept in correct position and/or relation between the individual three-dimensional digital tooth models as well as in composition.

The first and second criteria may define relative relations between the three-dimensional digital tooth models of the three-dimensional digital teeth model such that the three-dimensional digital teeth model reacts in a chain-like manner to modifications of the selected one or more three-dimensional digital tooth models. The remaining three-dimensional digital tooth models are adjusted depending on the modification of the selected one or more three-dimensional digital tooth models such that the chain like structure is preserved.

The first and second criteria may further define symmetric relations between the three-dimensional digital tooth models of the three-dimensional digital teeth model. For example, in case the three-dimensional digital teeth model comprises three-dimensional digital tooth models of both hemiarches of a dental arch a symmetry of between the three-dimensional digital tooth models of the hemiarches may be implemented. In case one or more selected three-dimensional digital tooth models of one hemiarch, also referred to as a semiarch, are modified and/or adjusted, e.g., one or more corresponding symmetrically opposite three-dimensional digital tooth models of the other hemiarch may be modified and/or adjusted analogously. In case one or more remaining three-dimensional digital tooth models of one hemiarch are adjusted, e.g., one or more corresponding symmetrically opposite three-dimensional digital tooth models of the other hemiarch may be adjusted analogously. Thus, any modification of a selected three-dimensional digital tooth model and/or any adjustment of a remaining three-dimensional digital tooth model on one jaw side may, e.g., be mirrored to the other jaw side along a symmetry plane defined between the two sides of the jaw.

By controlling, which adjustments are calculated and applied simultaneously, it is possible to balance between an available processing power of a computer device used for executing the method and required processing power required for executing the calculations and applications of adjustments resulting from the second input, i.e., the adjustments for the selected one or more three-dimensional digital tooth models as well as the adjustments for the remaining three-dimensional digital tooth models.

The receiving of the three-dimensional digital teeth model may, e.g., comprise generating the three-dimensional digital teeth model or the three-dimensional digital teeth model may, e.g., be received from an external source. The external source may, e.g., be a server, like a cloud server, providing the three-dimensional digital tooth model via a network. The external source may, e.g., be a removable storage device providing the three-dimensional digital tooth model via a direct communication connection, e.g., wireless or via a wire.

For generating the three-dimensional digital teeth model scan data of the current dentition state may be used. The patient may be edentulous. In this case, the scan data may be scan data of one or more edentulous jaws of the patient, i.e., of the patient's gingiva and the form of the patient's jaw bones, on which the dental restoration is to be arranged. In case the patient's dentition comprise one or more remaining teeth, the scan data may comprise scan data being descriptive of the position and form the remaining teeth in the patient's oral cavity. For example in case of a dental restoration in form of a partial denture, the denture may be configured to supplement missing or damaged teeth. Thus, one or more of the remaining teeth described by the scan data may remain unaltered by the application of the denture. The three-dimensional digital teeth model may comprise one or more three-dimensional digital tooth models descriptive of artificial teeth to be arranged next to and/or between remaining teeth of the patient. One or more of the remaining teeth may be prepared, in order to provide a support for the dental restoration, e.g., a complete or a partial denture. The three-dimensional digital teeth model may comprise one or more three-dimensional digital tooth models descriptive of artificial teeth to be arranged on prepared teeth of the patient. The three-dimensional digital teeth model may comprise one or more three-dimensional digital tooth models descriptive of artificial teeth to be arranged abutments or a dental bar to be arranged in the patient's oral cavity. The scan data of the current dentition state of the patient may be acquired using a scanner, e.g., an optical scanner. The scan may be a direct scan of the patient's oral cavity, i.e., an intraoral scan. Alternatively or additionally, an indirect scan of the oral cavity may be used to acquire the scan data. For example, an impression of the patient's soft and hard oral tissue or a model of the respective oral tissue, like a plaster model, may be scanned.

The three-dimensional digital teeth model may be descriptive of a target state to be achieved using the dental restoration to be manufactured.

For generating the three-dimensional digital teeth model, e.g., a tooth library may be used providing sets of three-dimensional digital library tooth models. For example, the three-dimensional digital library tooth models may be adjusted to the individual current dentition state of the patient using the method for adjusting the arrangement of the three-dimensional digital tooth models, e.g., three-dimensional digital library tooth models. For example, the three-dimensional digital library tooth models may be arranged in a preliminary arrangement, in order to provide the three-dimensional digital teeth model. For example, the three-dimensional digital teeth model may comprise one or more three-dimensional digital tooth models provided using scan data of one or more remaining teeth of the patient's dentition, e.g., opposite teeth within the same dental arch or antagonists. The three-dimensional digital tooth model of the other teeth may be generated using scan data of the respective other teeth. For example, the three-dimensional digital tooth models of the other teeth may be adjusted to the individual current dentition state of the patient using the method for adjusting the arrangement of the three-dimensional digital tooth models. For example, the three-dimensional digital tooth models of the other teeth may be arranged in a preliminary arrangement, in order to provide the three-dimensional digital teeth model. For example, the three-dimensional digital tooth models may be generated from scratch.

For example, a trained machine learning module may be used for generating the three-dimensional digital teeth model. For generating the three-dimensional digital teeth model, the trained machine learning module may, e.g., use a three-dimensional digital dentition model of a current dentition state of the patient. The three-dimensional digital dentition model of a current dentition state of the patient may, e.g., be provided using scan data of the dental cavity of the patient. The three-dimensional digital teeth model may be received as output from the trained machine learning module in response to providing the three-dimensional digital dentition model as input.

The trained machine learning module may be trained to provide the three-dimensional digital teeth model as output in response to receiving the three-dimensional digital dentition model as input.

For example, a providing of the trained machine learning module may comprise providing a machine learning module to be trained. A set of training datasets may be provided for training the machine learning module to be trained. For example, each training dataset may comprise a three-dimensional digital training dentition model as well as a three-dimensional digital training teeth model. The machine learning module to be trained may be trained to provide the three-dimensional digital training teeth models of the training datasets as an output in response to receiving the three-dimensional digital training dentition models of the respective training datasets as input.

The machine learning module to be trained may, e.g., be an untrained machine learning module, a pre-trained machine learning module or a partially trained machine learning module. The machine learning module being trained may be an untrained machine learning module, which is trained from scratch. Alternatively, the machine learning module being trained may be a pre-trained or partially trained machine learning module. In general, it may not be necessary to start with an untrained machine learning module, e.g., in deep learning. For example, one may start with a pre-trained or partially trained machine learning module. The pre-trained or partially trained machine learning module may have been pre-trained or partially trained for the same or a similar task. Using a pre-trained or partially trained machine learning may, e.g., enable a faster training of the trained machine learning module to be trained, i.e., the training may converge faster. For example, transfer learning may be used for training a pre-trained or partially trained machine learning module. Transfer learning refers to a machine learning process, which rather than starting the learning process from scratch starts from patterns that have been previously learned, when solving a different problem. This way previous learnings may, e.g., be leveraged, avoiding to start from scratch. A pre-trained machine learning module is a machine learning module that was trained previously, e.g., on a large benchmark dataset to solve a problem similar to the one to be solved by the additional learning. In case of a pre-trained machine learning module a previous learning process has been completed successfully. A partially trained machine learning module is a machine learning module, which has been partially trained, i.e., the training process may not have been completed yet. A pre-trained or partially machine learning module may, e.g., be import and trained to be used for the purposes disclosed herein.

The term "machine learning" (ML) refers to a computer algorithm used to extract useful information from training data sets by building probabilistic models, which are referred to as machine learning modules or models, in an automated way. A machine learning module may also be referred to as a predictive model. Machine learning algorithms build a mathematical model based on sample data, known as "training data", in order to make predictions or decisions without being explicitly programmed to perform the task. The machine learning module may be performed using a learning algorithm such as supervised or unsupervised learning. The machine learning module may be based on various techniques such as clustering, classification, linear regression, reinforcement, self-learning, support vector machines, neural networks, etc. A machine learning module may, e.g., be a data structure or program such as a neural network, in particular a convolutional neural network, a support vector machine, a decision tree, a Bayesian network etc. The machine learning module may be adapted to predict an unmeasured value, e.g., a three-dimensional digital teeth model as output by the trained machine learning module. The trained machine learning module may predict the unmeasured value from other, known values, e.g., a three-dimensional digital dentition model as input. According to an example, the machine learning module may comprise a deep learning model.

For example, the calculating and applying of at least a part of the adjustments of the remaining three-dimensional digital tooth models is executed upon a completion of the modification of the selected one or more three-dimensional digital tooth models.

Thus, for at least a part of the adjustments or even all the of the adjustments of the remaining three-dimensional digital tooth models an execution may be postponed until the modification of the selected one or more three-dimensional digital tooth models is completed. This completion may, e.g., be indicated by a selection and/or modification deactivation input like a mouseup event or a click event.

This may, e.g., enable a real-time update of the modification of the selected one or more three-dimensional digital tooth models as well as the adjustments of a geometric form of the selected one or more three-dimensional digital tooth models. For example, the modification of the selected one or more three-dimensional digital tooth models as well as the adjustments of a geometric form of the selected one or more three-dimensional digital tooth models may be updated with a rate of at least 20 frames per second, e.g., 20 to 30 frames per second.

Executing at least a part of the adjustments of the remaining three-dimensional digital tooth models only upon a completion of the modification of the selected one or more three-dimensional digital tooth models may reduce the processing power required simultaneously. Otherwise, in case all the adjustments would be calculated for each of the three-dimensional digital tooth model comprised by the three-dimensional digital teeth model simultaneously, the available processing power of the computer system executing the method was to be divided between the $n>1$ three-dimensional digital tooth models comprised by the three-dimensional digital teeth model.

For example, only selected types of adjustments of the remaining three-dimensional digital tooth models, like a moving, scaling and/or deforming, may be calculated and applied simultaneously with the modification of the selected one or more three-dimensional digital tooth models, whereas other non-selected types of adjustments may only be calculated and applied after completion of the modification. In this case, the non-selected types of adjustments are only calculated and displayed once for the completed modification, while the selected types of adjustments are calculated and displayed repeatedly for each step of the modification of the selected one or more three-dimensional digital tooth models until the modification is completed. Thus, the processing power required simultaneously may be reasonably balanced.

For example, all types of adjustments of the remaining three-dimensional digital tooth models are postponed, until the modification is completed, i.e., none of the adjustments of the remaining three-dimensional digital tooth models is calculated and applied simultaneously with the modification of the selected one or more three-dimensional digital tooth models. Thus, all the adjustments of the remaining three-dimensional digital tooth models are calculated and displayed only once for the modification completed, thus significantly reducing the required processing power.

For example, for a selected first set of types of adjustments the calculating and applying of adjustments of types comprised by the selected first set to the remaining three-dimensional digital tooth models is executed together with the modification of the selected one or more three-dimensional digital tooth models, whereas the calculating and applying of the adjustments of other types of adjustments to the remaining three-dimensional digital tooth models is executed upon the completion of the modification of the selected one or more three-dimensional digital tooth models.

For example, types of adjustments comprised by the selected first set of types of adjustments may be calculated and applied simultaneously with the modification of the selected one or more three-dimensional digital tooth models, i.e., repeatedly during the modification of the selected one or more three-dimensional digital tooth models. Thereby, repeatedly intermediate states of the modification selected one or more three-dimensional digital tooth models may be used for repeatedly calculated and applied the selected types of adjustments. In contrast, types of adjustments not comprised by the selected first set of types of adjustments may be calculated and applied only once upon the completion of the modification of the selected one or more three-dimensional digital tooth models taking into account only the final state of the modification selected one or more three-dimensional digital tooth models.

For example, the selected first set of types of adjustments comprises pre-selected types of adjustments. For example, a third input is received pre-selecting the pre-selected types of adjustments to be comprised by the selected first set of types of adjustments.

For example, the method further comprises dynamically selecting types of adjustments to be comprised by the selected first set of types of adjustments using estimates of processing power required for executing the different types of adjustments of the remaining three-dimensional digital tooth models. An estimated required overall processing power, which is required for executing the types of adjustments of the remaining three-dimensional digital tooth models selected to be comprised by the selected first set of types of adjustments and for modifying the selected one or more three-dimensional digital tooth models, is equal to or smaller than an available processing power of a computer system executing the method.

For example, types of adjustments being calculated and applied simultaneously with the modification of the selected one or more three-dimensional digital tooth models may be selected dynamically taking into account the available processing power of the computer system executing the method. For example, only those types of adjustments may be selected, for which it may be ensured in view of the available processing power of the computer system executing the method that modification as well as adjustment of the selected one or more three-dimensional digital tooth models as well as the selected types of adjustments of the remaining three-dimensional digital tooth models may be executed and display in real time.

For example, a priority ranking of the different types of adjustments may be provided. For example, a priority ranking of the different types of adjustments may be provided, depending on the task under consideration. Based on the priority ranking the one or more highest ranked types of adjustments may be dynamically selected, for which it can be ensured that the resulting the estimated required overall processing power is equal to or smaller than the available processing power of the computer system executing the method.

Thus, an automatic balancing between the available processing power and the required overall processing power, which is required for executing the types of adjustments of the remaining three-dimensional digital tooth models selected to be comprised by the selected first set of types of adjustments and for modifying the selected one or more three-dimensional digital tooth models, may be implemented. For example, it may be balanced between different types of adjustments, i.e., subtasks, e.g., depending on a priority ranking. For example, in case the available processing power is too small to calculate deformations of all remaining three-dimensional digital tooth models to their antagonists and simultaneously deformations ensuring a minimum thickness, one type of deformations, i.e., adjustments may be selected, while the other type of deformations, i.e., adjustments is executed upon completion of the modification of the selected one or more three-dimensional digital tooth models.

For example, only a minor subtask may be executed simultaneously, like a proper offsetting to keep the teeth described by the remaining three-dimensional digital tooth models in acceptable limits, thus easing the deformation task to be executed upon completion of the modification of the selected one or more three-dimensional digital tooth models.

By executing selected types of adjustments simultaneously with the selected one or more three-dimensional digital tooth models, a user may get some valuable visual feedback from interactions between the modification of the selected one or more three-dimensional digital tooth models and the remaining three-dimensional digital tooth models, although not having enough processing power to calculate all types of adjustments simultaneously.

For example, the calculating and applying of all the adjustments of the remaining three-dimensional digital tooth models is executed upon a completion of the modification of the selected one or more three-dimensional digital tooth models. Thus, an automatically calculating and applying of adjustments of the remaining three-dimensional digital tooth models may be implementable even on a computer device with a comparably low processing power. In particular, instant anatomic morphing may be implementable for a plurality of three-dimensional digital tooth models, e.g., all the remaining of three-dimensional digital tooth models.

For example, the calculating and applying of the adjustments of the geometric form of the selected one or more three-dimensional digital tooth models are executed in discrete steps at a first rate of executions per second. The calculating and applying of at least a part of the adjustments of the remaining three-dimensional digital tooth models is executed in discrete steps, at the same first rate of executions per second. The automatically calculating of the adjustments of the remaining three-dimensional digital tooth models is performed, while the selected one or more three-dimensional digital tooth models are modified according to the second input. Thus, calculating and applying the adjustments for all the selected one or more three-dimensional digital tooth models as well as the remaining three-dimensional digital tooth models may, e.g., be executed simultaneously.

For example, the calculating and applying of the adjustments of the geometric form of the selected one or more three-dimensional digital tooth models are executed in discrete steps at a first rate of executions per second. The calculating and applying of at least a part of the adjustments of the remaining three-dimensional digital tooth models is executed in discrete steps at a second rate of executions per second with the second rate being lower than the first rate. The automatically calculating of the adjustments of the remaining three-dimensional digital tooth models is performed, while the selected one or more three-dimensional digital tooth models are modified according to the second input.

By using different rates of executions per second for different types of adjustments, resulting in different frames per second for the displaying of the respective adjustments, the processing power required executing the calculating and applying of the adjustments may be balanced. The selected types of adjustments are calculated and applied with a higher repetition rate, e.g., resulting in a real-time displaying of these types of adjustments, while the non-selected other types of adjustments are calculated and applied with a higher repetition rate. Thus, the non-selected other types of adjustments may not be displayed in real time. However, a user may still get some valuable feedback from interactions between the modification of the selected one or more three-dimensional digital tooth models and the remaining three-dimensional digital tooth models, even though not in real time. Nevertheless, the automatic non-real-time adjustments may provide some guidance on how to proceed with the modification, in order to achieve a satisfying result taking into account even the impact on the remaining three-dimensional digital tooth models.

For example, the first rate is a rate of at least 20 executions per second. This rate may enable a real-time displaying of the modification and adjustments of the selected one or more three-dimensional digital tooth models. For example, the first rate is a rate from 20 to 30 executions per second. However, the first rate could even be higher, like 40, 50, 60, 70, 80, 90 or 100 executions per second.

For example, the second rate is significantly lower than the first rate. For example, the second rate is lower by 10%, 20% or 25% relative to the first rate. In case of a first rate of 20 to 30 executions per second, the second rate may, e.g., be lower by 2, 4 or 5 executions per second. For example, the second rate is lowered dynamically relative to the first rate.

For example, for a selected second set of types of adjustments the calculating and applying of adjustments of types comprised by the selected second set to the remaining three-dimensional digital tooth models is executed at the first rate, whereas the calculating and applying of the adjustments of other types of adjustments to the remaining three-dimensional digital tooth models are executed at the second rate.

For example, types of adjustments comprised by the selected second set of types of adjustments may be calculated and applied simultaneously with the modification of the selected one or more three-dimensional digital tooth models, i.e., repeatedly during the modification of the selected one or more three-dimensional digital tooth models at the same first rate as the modification. Thereby, repeatedly intermediate states of the modification selected one or more three-dimensional digital tooth models may be used for repeatedly calculated and applied the selected types of adjustments at the first rate. In contrast, types of adjustments not comprised by the selected second set of types of adjustments may be calculated and applied with a lower second rate, i.e., repeated less often and calculated for less intermediate states of the modification selected one or more three-dimensional digital tooth models than the types of adjustments comprised by the selected second set of types of adjustments.

For example, the selected second set of types of adjustments comprises pre-selected types of adjustments. For example, a fourth input is received pre-selecting the pre-selected types of adjustments to be comprised by the selected first set of types of adjustments.

For example, the method further comprises dynamically selecting types of adjustments to be comprised by the selected second set of types of adjustments using estimates of processing power required for executing the different types of adjustments of the remaining three-dimensional digital tooth models. An estimated required overall processing power, which is required for executing the types of adjustments of the remaining three-dimensional digital tooth models selected to be comprised by the selected second set of types of adjustments and for modifying the selected one or more three-dimensional digital tooth models, is equal to or smaller than the available processing power of the computer system executing the method.

For example, types of adjustments being calculated and applied simultaneously with the modification of the selected one or more three-dimensional digital tooth models at the same first rate may be selected dynamically taking into account the available processing power of the computer system executing the method. For example, only those types of adjustments may be selected, for which it may be ensured in view of the available processing power of the computer system executing the method that modification as well as adjustment of the selected one or more three-dimensional digital tooth models as well as the selected types of adjustments of the remaining three-dimensional digital tooth models may be executed and display in real time.

For example, a priority ranking of the different types of adjustments may be provided. Based on the priority ranking the one or more highest ranked types of adjustments may be selected, for which it can be ensured that the resulting the estimated required overall processing power is equal to or smaller than the available processing power of the computer system executing the method.

Thus, an automatic balancing between the available processing power and the required overall processing power, which is required for executing the types of adjustments of the remaining three-dimensional digital tooth models selected to be comprised by the selected first set of types of adjustments and for modifying the selected one or more three-dimensional digital tooth models, may be implemented. For example, it may be balanced between different types of adjustments, i.e., subtasks, e.g., depending on a priority ranking. For example, in case the available processing power is too small to calculate deformations of all remaining three-dimensional digital tooth models to their antagonists and simultaneously deformations ensuring a minimum thickness, one type of deformations, i.e., adjustments may be selected to be executed at the first rate, while the other type of deformations, i.e., adjustments is executed at the lower second rate. For example, only a minor subtask may be executed simultaneously at the first rate, like a proper offsetting to keep the teeth described by the remaining three-dimensional digital tooth models in acceptable limits, thus easing the deformation task to be executed at the second rate.

By executing selected types of adjustments simultaneously at the same first rate with the selected one or more three-dimensional digital tooth models, a user may get some valuable feedback from interactions between the modification of the selected one or more three-dimensional digital tooth models and the remaining three-dimensional digital tooth models, although not having enough processing power to calculate all types of adjustments simultaneously at the first rate.

For example, the calculating and applying of all the adjustments of the remaining three-dimensional digital tooth models are executed with the second rate. Thus, an automatically calculating and applying of adjustments of the remaining three-dimensional digital tooth models may be implementable even on a computer device with a lower processing power. In particular, instant anatomic morphing may be implementable for a plurality of three-dimensional digital tooth models, e.g., all the remaining of three-dimensional digital tooth models, even though not necessarily in real time.

For example, the adjustments of the geometric form of the selected one or more three-dimensional digital tooth models are displayed using a display device in discrete steps at the first rate, while the at least part of the adjustments of the remaining three-dimensional digital tooth models are displayed on the display device in discrete steps at the second rate. For a transition between consecutive discrete steps of the adjustments of the remaining three-dimensional digital tooth models being displayed one of the following are used: an overlapping, a morphing.

For example, modifications/adjustments of individual three-dimensional digital tooth models of the three-dimensional digital teeth model may be displayable independently of each other, e.g., in discrete steps using different rates. For example, different frames may be displayed at the first rate or a higher rate. Each of the frames being displayed, which corresponds to the first rate, may show a discrete step of the adjustments of the geometric form of the selected one or more three-dimensional digital tooth models being calculated and applied at the same first rate. Each of the frames displayed, which corresponds to a lower second rate, may, e.g., show a discrete step of the adjustments of the remaining three-dimensional digital tooth models being automatically calculated and applied at the lower second rate.

For example, an individual three-dimensional digital tooth model may be displayed unaltered until an adjustment of the three-dimensional digital tooth model has been calculated and applied, which is then displayed as a discrete step. Thus, the changes the three-dimensional digital tooth model due to the adjustment may be applied from one frame to the other without any smoothening of the transition. In case the rate of calculating and applying adjustments of the respective three-dimensional digital tooth model is high enough, transitions between the discrete steps may still appear to be smooth to the human eye.

For example, a rate of calculating and applying of adjustments of an individual three-dimensional digital tooth model may be lower than a rate at which frames are displayed using a display device. Thus, instead of repeatedly displaying the unaltered three-dimensional digital tooth model on frames between consecutive steps of adjustments, the transition between these consecutive discrete steps of the adjustments may be smoothened.

For smoothening the transition between discrete steps, e.g., an overlapping may be used. Thus, for one or more frames in between the discrete steps the results of both steps, i.e., image of the respective individual three-dimensional digital tooth model with and without the respective adjustments, may be overlayed and displayed simultaneously.

For smoothening the transition between discrete steps, e.g., a dissolve overlapping may be used. Thus, a transition may be displayed, in which the respective individual three-dimensional digital tooth model with the respective adjustments of a consecutive discrete step fades over the respective individual three-dimensional digital tooth model without the respective adjustments. For the duration of the effect, e.g., on frames in between frames of the second rate, an image of the respective individual three-dimensional digital tooth model with and without the respective adjustments may be overlayed and displayed simultaneously. From frame to frame a degree of transparency of the image of the respective individual three-dimensional digital tooth model with without the respective adjustments may be increased, while a degree of transparency of the image of the respective individual three-dimensional digital tooth model with the respective adjustments may be decreased.

For smoothening the transition between discrete steps, e.g., a morphing may be used. Morphing refers to an effect that changes or morphs one frame or a section of a frame into another, i.e., an consecutive frame or section of a consecutive frame through a seamless transition. Thus, a transition may be displayed, in which the respective individual three-dimensional digital tooth model of one discrete step is morphed into the three-dimensional digital tooth model with the respective adjustments fades of a consecutive discrete step. For the duration of the effect, e.g., on frames in between frames of the second rate, the respective individual three-dimensional digital tooth model is displayed with changes resulting the morphing, i.e., with morphed features.

The morphing may, e.g., comprise distorting the respective individual three-dimensional digital tooth model of one discrete step at the same time that it faded into the three-dimensional digital tooth model with the respective adjustments fades of a consecutive discrete step. This may comprise marking corresponding points and/or vectors on the before state and after state of the respective individual three-dimensional digital tooth model, i.e., the respective individual three-dimensional digital tooth model without the adjustments of the consecutive discrete step having been applied and the respective individual three-dimensional digital tooth model with the adjustments of the consecutive discrete step having been applied.

In order to be able to display images of states of a three-dimensional digital tooth model at two consecutive discrete steps, the displaying may be time-delayed. For example, the displaying may be time delayed by the time difference between two consecutive discrete steps, e.g., two consecutive discrete steps according to the second rate. Thus, when displaying the images, the results of the calculating and applying of adjustments for both steps are available and may be used for smoothening the transition, e.g., using overlapping of morphing. For example, results of the automatic calculating and applying of adjustments of remaining three-dimensional digital tooth models of consecutive discrete steps of the second rate may be morphed into each other when they are finished to avoid sudden immediate jumps on the display device between each of these second rate results. Instead, the user may see a smooth transition between the second rate results, even though the second rate may be lower than the first rate. The smoothness of the transition may thus even be comparable to transitions of first-rate results.

A smoother displaying of transitions between discrete steps of calculation may, e.g., enable a more relaxed perception of results of the method, in particular by a user using the method over a longer period of time, e.g., one or more hours. Furthermore, a smoother displaying of transitions may, e.g., enable a more intuitive usage of the method by the user, since effects of inputs by the user may be more intuitively predictable for the user. Even a handling of an input device for providing the user input may thus be more intuitive and smoother for the user. Such an input device may, e.g., comprise one or more of the following user interface components: a keyboard, a mouse, a trackball, a touchpad, a pointing stick, a graphics tablet, a joystick, a gamepad, a webcam, a headset, a gear stick, a wired glove, a remote control, one or more switches, one or more buttons, an accelerometer.

For example, a plurality of processing units is used for executing the method. The modifying of the selected one or more three-dimensional digital tooth models according to the second input and the automatically calculating of the adjustments of the remaining three-dimensional digital tooth models are parallelized. The parallelizing comprises an execution of the modifying of the selected one or more three-dimensional digital tooth models and the automatically calculating of the adjustments of the remaining three-dimensional digital tooth models using different processing units of the plurality of processing units.

By parallelizing the modifying of the selected one or more three-dimensional digital tooth models according to the second input and the automatically calculating of the adjustments of the remaining three-dimensional digital tooth models results may be calculated faster, enabling a smoother displaying of transitions between discrete steps of calculation. This may, e.g., enable a more relaxed perception of results of the method, in particular by a user using the method over a longer period of time, e.g., one or more hours. Furthermore, a smoother displaying of transitions may, e.g., enable a more intuitive usage of the method by the user, since effects of inputs by the user may be more intuitively predictable for the user. Even a handling of an input device for providing the user input may thus be more intuitive and smoother for the user.

For example, the plurality of processing units comprises one or more primary processing units and one or more secondary processing units. The primary processing units have larger processing powers than the secondary processing units. The primary processing units may, e.g., be configured for a faster calculating of adjustments of three-dimensional digital tooth models. The parallelizing comprises an execution of the modifying of the selected one or more three-dimensional digital tooth models at the first rate using one or more of the one or more primary processing units and an execution of the at least part of the adjustments of the remaining three-dimensional digital tooth models at the second rate using one or more of the one or more secondary processing units.

Examples may, e.g., enable a distribution of calculations, which are to be performed at the second rate, which is, e.g., slower than real time, on secondary processing units. Calculations, which are to be performed at the first rate, which is, e.g., fast enough to provide an impression of a real-time applying of adjustments, on primary processing units. Calculation may, e.g., be distributed in a second dynamic rate onto those secondary processing units to be worked out in the background for a preceding discrete step or configuration and presented onto the screen as soon as these background secondary processing units are finished. If there, e.g., was a modification in the configuration, while these secondary processing units have been calculating, they may either cancel the respective calculation and re-start it right away to present the result as a fixed second-rate result without any delays on the GUI or they may finish their calculation, present the result and then re-start the calculation for the modified configuration.

For example, one or more multi-core processors may be used. Such multi-core processors are microprocessors on a single integrated circuit with two or more separate processing units, called cores, each of which reads and executes program instructions. A multi-core processor implements multiprocessing in a single physical package.

The primary processing units may, e.g., be central processing units or dedicated processing units specifically configured for calculating adjustments of three-dimensional digital models, like three-dimensional digital tooth models. Such dedicated processing units may, e.g., comprise graphics processing units. Graphics processing units (GPUs) are a specialized electronic circuit designed to manipulate and alter memory to accelerate the creation of images in a frame buffer intended for output to a display device.

For example, the modification of the selected one or more three-dimensional digital tooth models comprises one or more of the following types of modification: a translational movement, a rotational movement, a scaling, a modification of a geometric form.

Thus, the modification of the selected one or more three-dimensional digital tooth models may, e.g., comprise a lateral movement and/or a rotational movement. The modification may, e.g., comprise a modification of a size of the selected one or more the three-dimensional digital tooth models. For this purpose, the modification may, e.g., comprise a scaling. The modification may, e.g., comprise a modification of a geometric form of the selected one or more the three-dimensional digital tooth models. For example, an approximal deformation may be comprised resulting a propagation of this modification to the remaining three-dimensional digital tooth models, in order to preserve relative positioning requirements between the selected one or more three-dimensional digital tooth models as well as the remaining three-dimensional digital tooth models defined by the first and second geometric criteria.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

Thus, a relation of the selected one or more three-dimensional digital tooth models to an antagonist may be preserved to a certain degree, e.g., implementing an anatomic tooth morphing. Furthermore, a relation to an approximal tooth, i.e., a neighbor tooth, may be preserved to a certain degree. Finally, a minimum thickness may be preserved for the selected one or more three-dimensional digital tooth models.

For example, the adjustments of the geometric form of the selected one or more three-dimensional digital tooth models comprises one or more of the following types of adjustments: a cutting of one or more sections of the geometric form of the selected one or more three-dimensional digital tooth models, a deforming of the geometric form of the selected one or more three-dimensional digital tooth models.

For example, the adjustments of the remaining three-dimensional digital tooth models comprise one or more of the following types of adjustments: a translational movement, a rotational movement, a scaling, an adjustment of geometric forms of the remaining three-dimensional digital tooth models.

Thus, the adjustments of the remaining three-dimensional digital tooth models may, e.g., comprise a lateral movement and/or a rotational movement. The adjustments may, e.g., comprise adjustments of a size of the remaining the three-dimensional digital tooth models. For this purpose, the adjustments may, e.g., comprise a scaling. The adjustments may, e.g., comprise adjustments of geometric forms of the remaining three-dimensional digital tooth models. For example, an approximal deformation may be comprised resulting a propagation of these adjustments through the remaining three-dimensional digital tooth models, in order to preserve relative positioning requirements between the selected one or more three-dimensional digital tooth models as well as the remaining three-dimensional digital tooth models defined by the first and second geometric criteria.

For example, the adjustments of geometric forms of the remaining three-dimensional digital tooth models are calculated in order to satisfy one or more second geometric criteria for the remaining three-dimensional digital tooth models. Using these one or more second geometric criteria, e.g., an instant anatomic morphing may be implemented for the remaining three-dimensional digital tooth models.

For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

Thus, a relation of the remaining three-dimensional digital tooth models to antagonists may be preserved to a certain degree, e.g., implementing an anatomic tooth morphing for the remaining three-dimensional digital tooth models. Furthermore, approximal relations, i.e., relations to a neighbor tooth, may be preserved to a certain degree. Finally, a minimum thickness may be preserved for the remaining three-dimensional digital tooth models.

For example, the adjustments of the geometric forms of the remaining three-dimensional digital tooth models comprise one or more of the following: a cutting of one or more sections of the geometric form of the respective remaining three-dimensional digital tooth model, a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

Thus, the degree of impact of the modification and adjustments of the selected one or more three-dimensional digital tooth models on the remaining three-dimensional digital tooth model may decrease with the distance of the respective remaining three-dimensional digital tooth models form the selected one or more three-dimensional digital tooth models.

For example, the weights used for the weighting the adjustments of the remaining three-dimensional digital tooth models may decrease with the distance of the remaining three-dimensional digital tooth model for which the respective adjustment is calculated from the selected three-dimensional digital tooth model.

For example, the arrangement of the three-dimensional digital tooth models extends along at least a section of an arch of a jaw of a patient. The adjustments of the selected one or more three-dimensional digital tooth models and/or the adjustments of the remaining three-dimensional digital tooth models may, e.g., preserve the form of the arrangement extending along the section of the arch of the jaw.

For example, the set of the remaining three-dimensional digital tooth models, for which adjustments are calculated, comprise all the remaining three-dimensional digital tooth models comprised by the three-dimensional digital teeth model.

For example, the set of the remaining three-dimensional digital tooth models, for which adjustments are calculated, are a subset of the three-dimensional digital tooth models comprised by the three-dimensional digital teeth model. Thus, not all the remaining three-dimensional digital tooth models may, e.g., be adjusted, but only a subset. For example, the method further comprises receiving a fifth input identifying the subset of the remaining three-dimensional digital tooth models, for which adjustments are to be calculated and applied.

For example, the arrangement of the plurality of the three-dimensional digital tooth models, i.e., the three-dimensional digital teeth model, defines a complete dental arch. For example, the dental restoration to be manufactured is a complete denture.

For example, the arrangement of the plurality of the three-dimensional digital tooth models defines a first complete mandibular dental arch for the patient and a second complete maxillary dental arch for the patient. For example, the dental restoration to be manufactured comprising a first dental restoration part being a complete mandibular dental restoration and a second dental restoration part being a complete maxillary dental restoration. For example, the arrangement of the three-dimensional digital tooth models of the mandibular and the maxillary dental arch may be adjusted after each other. For example, the arrangement of the three-dimensional digital tooth models of the mandibular and the maxillary dental arch may be adjusted simultaneously. For example, the selected one or more three-dimensional digital tooth models may only comprise three-dimensional digital tooth models of the same dental arch, i.e., either the mandibular or the maxillary dental arch. For example, the selected one or more three-dimensional digital tooth models may comprise antagonistic three-dimensional digital tooth models of both dental arches, i.e., of the mandibular and the maxillary dental arch.

For example, the arrangement of the plurality of the three-dimensional digital tooth models may define a part of the dental arch for the patient. For example, the dental restoration to be manufactured may be a partial denture or a bridge.

For example, the arrangement of the plurality of the three-dimensional digital tooth models defining a first part of the mandibular dental arch for the patient and an opposite second part of the maxillary dental arch for the patient. For example, the dental restoration to be manufactured comprising a first dental restoration part being a partial mandibular dental restoration and an opposite second dental restoration part being a partial maxillary dental restoration.

For example, the arrangement of the three-dimensional digital tooth models of the first part of the mandibular dental arch and the second part of the maxillary dental arch may be adjusted after each other. For example, the arrangement of the three-dimensional digital tooth models of the first part of the mandibular dental arch and the second part of the maxillary dental arch may be adjusted simultaneously. For example, the selected one or more three-dimensional digital tooth models may only comprise three-dimensional digital tooth models of the same dental arch, i.e., either the first part of the mandibular dental arch or the second part of the maxillary dental arch. For example, the selected one or more three-dimensional digital tooth models may comprise antagonistic three-dimensional digital tooth models of both dental arches, i.e., of the first part of the mandibular dental arch and the second part of the maxillary dental arch.

For example, the method further comprises generating a three-dimensional digital dental restoration model of the dental restoration to be manufactured using the adjusted three-dimensional digital teeth model provided for manufacturing the dental restoration and controlling a manufacturing of the dental restoration using the three-dimensional digital dental restoration model as template. The manufactured dental restoration is a physical copy of the template.

For example, the adjusted three-dimensional digital teeth model may define position and form of artificial teeth comprised by the dental restoration to be manufactured. Thus, three-dimensional digital dental restoration model may, e.g., comprise the three-dimensional digital tooth models of the adjusted three-dimensional digital teeth model. The three-dimensional digital dental restoration model may, e.g., further comprise a three-dimensional digital gingiva model defining an artificial gingiva to be comprised by the dental restoration. The three-dimensional digital dental restoration model may, e.g., further comprise a three-dimensional digital frame model defining structural frame elements to be comprised by the dental restoration, in order to provide the dental restoration with a sufficient stability. In addition, the frame elements may comprise connection elements configured for holding the dental restoration in place within an oral cavity of the patient.

For manufacturing the dental restoration or at least elements of the dental restoration, e.g., computer-controlled additive and/subtractive methods may be used. For example, the dental restoration being manufactured using at least one of the following: machining, three-dimensional printing, casting.

The dental restoration may, e.g., be a denture. For example, the dental restoration may, e.g., be a partial or a complete denture. A denture is a prosthetic device constructed to replace missing teeth and to be supported by surrounding soft and/or hard tissues of the oral cavity. The denture may, e.g., be a removable denture, e.g., a removable partial denture or a removable complete denture. Alternatively, the denture may, e.g., be a denture relying on bonding or clasping onto teeth or dental implants.

For example, the dental restoration may comprise one or more of the following: a veneer, a coping with coating, a crown, a bridge, a mockup, a waxup, a provisional.

A veneer is a layer of restoration material placed over a tooth, in order to cover one or more surfaces of the tooth. Veneers may, e.g., improve the aesthetics of a smile and/or protect the tooth's surface from damage. Indirect veneers are manufactured outside of a patient's oral cavity and then arranged on a tooth within the oral cavity. Direct veneers are built-up directly on a tooth inside a patient's oral cavity. The tooth may be prepared for receiving the veneer.

For example, two main types of restoration material may be used for manufacturing a veneer: composite and dental porcelain. A composite veneer may be directly placed on the tooth, i.e., built-up in the mouth of patient, or indirectly manufactured outside the mouth of the patient and later bonded to the tooth. In contrast, a porcelain veneer may only be indirectly manufactured outside the mouth of the patient. A full veneer crown, on the one hand, is dental restoration element that is configured to cover all the coronal tooth surfaces, i.e., the mesial, distal, facial, lingual and occlusal surfaces. A laminate veneer, on the other hand, is a thin layer of restoration material that may, e.g., cover only a single surface of a tooth, e.g., a labial surface. A laminate veneer may generally be used for aesthetic purposes.

Coping with coating refers to a dental restoration element, which is directly built on the tooth to be restored. An underlying coping is arranged on the tooth. The coping is configured to replicate the performance of a natural tooth. On the coping a coating is applied, which is configured to replicate the natural aesthetics of the tooth to be restored. For example, a ceramic coating may be used. Using a coping with coating to restore a tooth may have the beneficial effect of providing a dental restoration element that combines both durability and natural aesthetics.

A crown is a dental restoration element in form of a dental cap. Such a crown may, e.g., be provided in form of a full coverage crown or a partial crown, like a ⅞ crown or a ¾ crown. Partial crowns, like ⅞ and ¾ crowns, are hybrids between an onlay and a full coverage crown. They are categorized based on an estimated degree of wall coverage of the walls of the prepared tooth, on which the respective crown is arranged. For example, a ¾ crown aims to cover three thirds of the walls of the tooth to be restored, e.g., three out of the four walls, e.g., with the buccal wall being spared. For example, a ⅞ crown aims to cover seven eights of the walls of the tooth to be restored. A full coverage crown completely caps or encircles a prepared tooth. A crown may, e.g., be required when a large cavity threatens the health of a tooth. A crown may be bonded to the tooth prepared for receiving the crown using a bonding material, e.g., a dental cement. A crown may be made from various materials, which may be fabricated using indirect methods, i.e., outside the patient's oral cavity. Crowns may be used to improve strength, to improve appearance of teeth and/or to halt deterioration.

A bridge is a dental restoration in form of a permanent appliance used to replace one or more missing teeth. A dental bridge comprises a plurality of artificial dental elements that are fused together, e.g., one or more artificial replacement teeth are definitively joined to adjacent teeth. A conventional bridge may be supported, e.g., by full coverage crowns, partial crowns, overlays, onlays or inlays on the abutment teeth. The abutment teeth require preparation and reduction to support the bridge.

A mockup prosthetic restoration composite is a composite to be arranged within a patient's mouth in order to visualize for the patient a result of a prosthetic restoration, before the actual prosthetic restoration is executed. Thus, the patient as well as a dentist may asses the expected esthetic and functional outcome of the prosthetic restoration. The final result to be expected may thus be visualized at an early stage of planning a prosthetic restoration. This approach may ensure that the patient as well as the dentist may the same result to be achieved in mind and allows for potential adjustments to be made prior to the final restorations manufactured and applied, e.g., cemented.

A waxup prosthetic restoration refers to a prosthetic restoration made from laboratory wax. Such a waxup prosthetic restoration is used for acquiring information indicative of whether a specific prosthetic restoration is appropriate. A planned prosthetic restoration may be generated using from laboratory wax. The waxup prosthetic restoration may be used to test, whether the planned prosthetic restoration is appropriate. Using wax may have the beneficial effect, that the waxup prosthetic restoration may be easily adjusted to also test adjustments of the planned prosthetic restoration and/or adjusting the planned prosthetic restoration to requirements determined using the waxup prosthetic restoration.

A waxup model may, e.g., be used by a doctor and/or a practitioner for visualization purposes. Furthermore, it may, e.g., also be used for generating one or more in-mouth preparation guiding surfaces, e.g., using silicon imprints, where the doctor and/or practitioner may measure and/or visually gauge, whether a planned tooth reduction has been performed.

A provisional is a type of interim dental restoration designed to be a template for the final restoration. It is used to verify, e.g., a comfort in occlusion for the patient, esthetic parameters that satisfy the patient's and dentist's expected goals and/or phonetic evaluation for speech and airflow. Esthetic parameters ma, e.g., comprise shape, midlines, smile line, embrasure shapes, and/or position of contacts. The phonetic evaluation for speech and airflow may ensure that no sibilance, whistlers, and/or lisp occur and a clear articulation being enabled by the prosthetic restoration resembled by the provisional.

In another aspect, a computer program product is disclosed for adjusting an arrangement of a plurality of three-dimensional digital tooth models for a dental restoration. The computer program product comprises a computer readable storage medium having program instructions embodied therewith. The program instructions are executable by a processor of a computer device to cause the computer device to receive a three-dimensional digital teeth model comprising the plurality of the three-dimensional digital tooth models. The three-dimensional digital teeth model defines an arrangement of a plurality of artificial teeth for the dental restoration. Each of the three-dimensional digital tooth models defines an individual artificial tooth of the plurality of artificial teeth. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. Adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The resulting adjusted three-dimensional digital teeth model is provided for manufacturing the dental restoration.

The program instructions provided by the computer program product may further be executable by the processor of the computer device to cause the computer device to execute any of the aforementioned examples of the method for adjusting an arrangement of a plurality of three-dimensional digital tooth models for a dental restoration.

In another aspect, a computer program is disclosed for adjusting an arrangement of a plurality of three-dimensional digital tooth models for a dental restoration. The computer program comprises program instructions. The program instructions are executable by a processor of a computer device to cause the computer device to receive a three-dimensional digital teeth model comprising the plurality of the three-dimensional digital tooth models. The three-dimensional digital teeth model defines an arrangement of a plurality of artificial teeth for the dental restoration. Each of the three-dimensional digital tooth models defines an individual artificial tooth of the plurality of artificial teeth. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. Adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The resulting adjusted three-dimensional digital teeth model is provided for manufacturing the dental restoration.

The program instructions provided by the computer program may further be executable by the processor of the computer device to cause the computer device to execute any of the aforementioned examples of the method for adjusting an arrangement of a plurality of three-dimensional digital tooth models for a dental restoration.

In another aspect, a computer device is disclosed for adjusting an arrangement of a plurality of three-dimensional digital tooth models for a dental restoration. The computer device comprises a processor and a memory storing program instructions executable by the processor. Execution of the program instructions by the processor causes the computer device to receive a three-dimensional digital teeth model comprising the plurality of the three-dimensional digital tooth models. The three-dimensional digital teeth model defines an arrangement of a plurality of artificial teeth for the dental restoration. Each of the three-dimensional digital tooth models defines an individual artificial tooth of the plurality of artificial teeth. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. Adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The resulting adjusted three-dimensional digital teeth model is provided for manufacturing the dental restoration.

Execution of the program instructions by the processor may further cause the computer device to execute any of the aforementioned examples of the method for adjusting an arrangement of a plurality of three-dimensional digital tooth models for a dental restoration.

In another aspect, a manufacturing system is disclosed. The system comprises a computer device according to any of the aforementioned examples of a computer device. The manufacturing system further comprises one or more manufacturing devices configured for manufacturing a dental restoration. Execution of the program instructions by the processor further causes the computer device to generate a three-dimensional digital dental restoration model of the dental restoration to be manufactured using the adjusted three-dimensional digital teeth model provided for manufacturing the dental restoration. Execution of the program instructions by the processor further causes the computer device to control the one or more manufacturing devices to manufacture the dental restoration using the three-dimensional digital dental restoration model as template. The manufactured dental restoration is a physical copy of the template.

Execution of the program instructions by the processor may further cause the computer device to control the one or more manufacturing devices to manufacture a dental restoration using a three-dimensional digital dental restoration model of the dental restoration generated using any of the aforementioned examples of the adjusted three-dimensional digital teeth model provided for manufacturing the dental restoration.

For example, the one or more manufacturing devices may comprise one or more of the following devices: a 3D printing device, a machining device.

It is understood that one or more of the aforementioned examples may be combined as long as the combined examples are not mutually exclusive.

BRIEF DESCRIPTION OF THE DRAWINGS

In the following, examples are described in greater detail making reference to the drawings in which.

DETAILED DESCRIPTION

Figure 1:
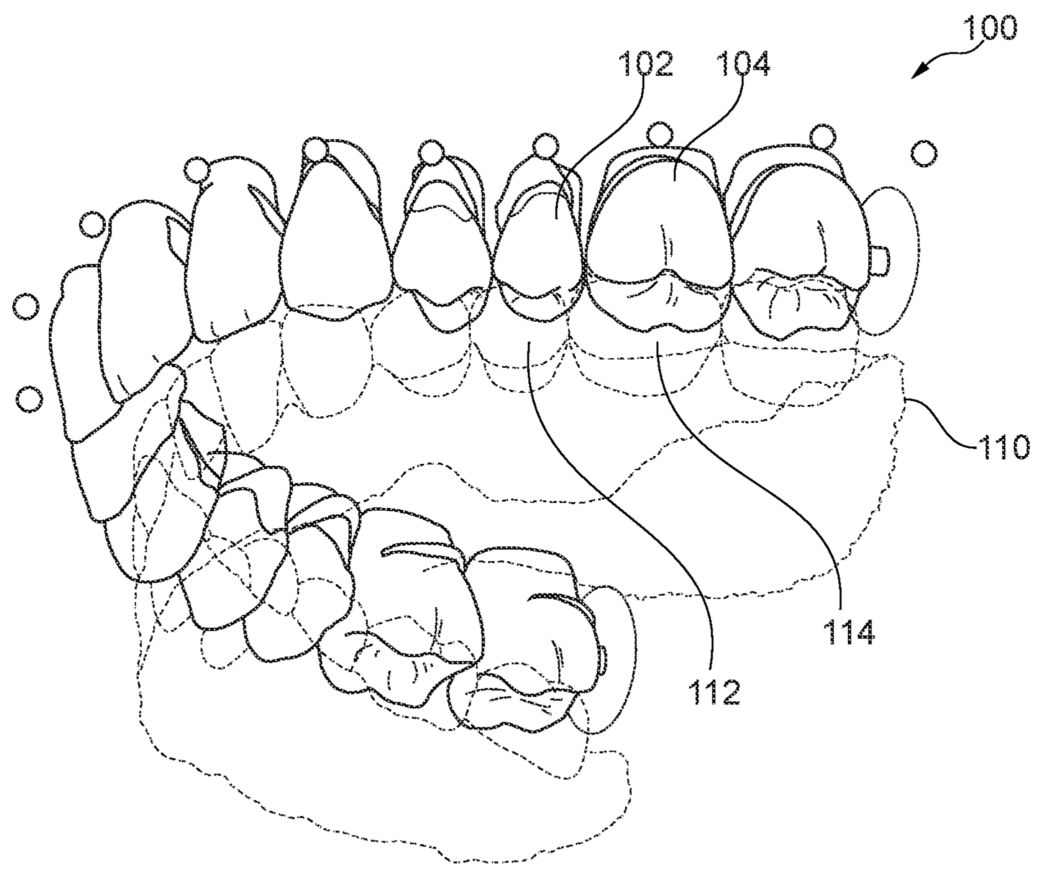
FIG. 1 is an exemplary three-dimensional digital teeth model comprising a plurality of three-dimensional digital tooth models for a dental restoration.

In the following, similar elements are denoted by the same reference numerals.

FIG. 1 shows an exemplary three-dimensional digital teeth model 100 comprising a plurality of three-dimensional digital tooth models 102, 104. The three-dimensional digital teeth model 100 defines an arrangement of a plurality of artificial teeth for a dental restoration. Each of the three-dimensional digital tooth models 102, 104 defines an individual artificial tooth of the plurality of artificial teeth. By a first input one or more of the three-dimensional digital tooth models 102 may be selected. By a second input a modification of the selected one or more three-dimensional digital tooth models 102 may be defined. The selected one or more three-dimensional digital tooth models 102 may be modified according to the second input. While the selected one or more three-dimensional digital tooth models 102 are modified according to the second input, adjustments of a geometric form of the selected one or more three-dimensional digital tooth models 102 may be automatically calculated and applied to the selected one or more three-dimensional digital tooth models 102. The adjustments are calculated in order to satisfy one or more first geometric criteria for the selected one or more three-dimensional digital tooth models 102.

The one or more first geometric criteria may, e.g., require for each of the selected three-dimensional digital tooth models 102 an adaptation of the geometric form, i.e., the tooth shape, of the respective selected three-dimensional digital tooth model 102 to an antagonist of the respective selected three-dimensional digital tooth model 102. The antagonists may, e.g., be provided by a second three-dimensional digital teeth model 110 of an opposite jaw comprising a plurality of three-dimensional digital models 112, 114 of antagonists. The second three-dimensional digital teeth model 110 may, e.g., be arranged in occlusion with the first three-dimensional digital teeth model 100. When a selected three-dimensional digital tooth model 102 is moved, scaled and/or deformed, the first geometric criteria may, e.g., require that the selected three-dimensional digital tooth model 102 does not intersect with the antagonist described by the three-dimensional digital models 112 of antagonist and/or that an occlusal contact with the antagonist is maintained in occlusion. For this purpose, the geometric form of the three-dimensional digital tooth model 102 may be automatically adjusted, e.g., cups of the occlusal surface of the selected three-dimensional digital tooth model 102 may be morphed to maintain contact, e.g., adequate contact areas, with antagonist. Thereby, an instant anatomic morphing of the selected three-dimensional digital tooth model 102 may be implemented. The occlusal surface of the selected three-dimensional digital tooth model 102 is automatically adapted to the three-dimensional digital models 112 of the antagonist. As a user modifies the selected three-dimensional digital tooth model 102, the user may be provided with a real-time display of an automatic adaption of the anatomy of the tooth described by the selected three-dimensional digital tooth model 102 to the antagonist described by the three-dimensional digital models 112 of antagonist with each step of the modification. The instant anatomic morphing automatically adjusts the occlusion.

Furthermore, adjustments of a set of remaining three-dimensional digital tooth models 104 of the three-dimensional digital teeth model 100 are automatically calculated depending on the modification of the selected one or more three-dimensional digital tooth models 102. The calculated adjustments are automatically applied to the remaining three-dimensional digital tooth models 014. The resulting adjusted three-dimensional digital teeth model 100 is provided for manufacturing the dental restoration.

The adjustments of geometric forms of the remaining three-dimensional digital tooth models 104 may be calculated such that one or more second geometric criteria for the remaining three-dimensional digital tooth models 104 are satisfied. Like the first criteria for the adjustments of the selected one or more three-dimensional digital tooth models 102, the second criteria for the adjustments of the remaining three-dimensional digital tooth models 104 may implement an instant anatomic morphing of the remaining three-dimensional digital tooth model 104 using three-dimensional digital models 114 of antagonists of the three-dimensional digital tooth model 104 comprised by the second three-dimensional digital teeth model 110. Thus, all adjustments may, e.g., executed such that occlusal surfaces of the remaining three-dimensional digital tooth models 104 are automatically adapted to their antagonists described by the three-dimensional digital models 114, when the adjustment remaining three-dimensional digital tooth models 104, e.g., comprises a movement, scaling and/or deforming resulting in an alteration of the geometric relations of the remaining three-dimensional digital tooth models 104 to their antagonists, i.e., three-dimensional digital models 114, in occlusion. When a user modifies the selected one or more three-dimensional digital tooth models 102, the user may automatically be provided with adaptions of the anatomy of the remaining three-dimensional digital tooth models 104 to their antagonists, when the remaining three-dimensional digital tooth models 104 are adjusted due to the modification of the selected one or more three-dimensional digital tooth models 102.

Thereby, instant anatomic tooth morphing for more than one three-dimensional digital tooth model may be implemented. Using chain preserving first and second criteria for the adjustments, it may be ensured for any modification of the selected one or more three-dimensional digital tooth models 102, for any adjustments of the geometric form of the selected one or more three-dimensional digital tooth models 102 as well as for any adjustments of the remaining three-dimensional digital tooth models 104, that the geometric form of any of the three-dimensional digital tooth models 102, 104 comprised by the three-dimensional digital teeth models 100 remains correct with respect I to its location within the dental arch as well as relative to the geometric forms of the other three-dimensional digital tooth models 102, 104. Thereby, it may be ensured that the three-dimensional digital tooth models 102, 104 of the adjusted three-dimensional digital teeth model 100 fit to the patient's dentition and/or jaw.

Figure 2:
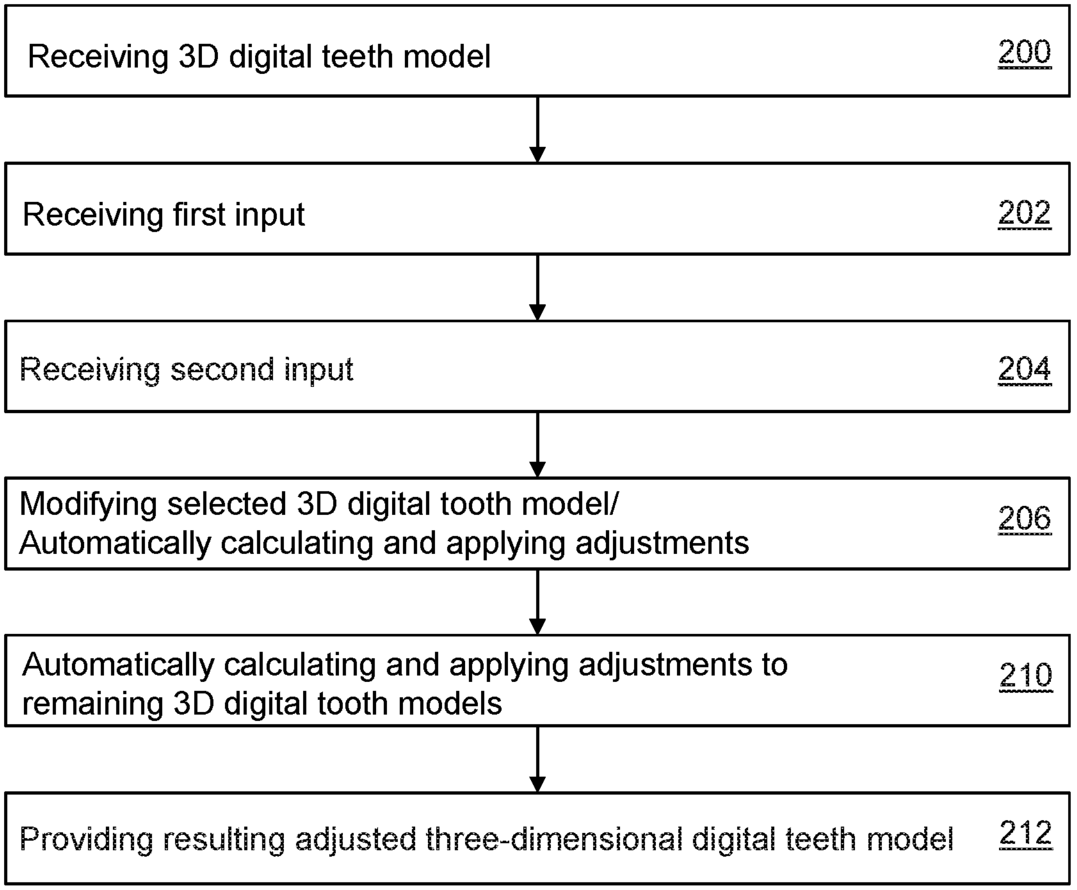
FIG. 2 shows a flowchart illustrating an exemplary method for adjusting an arrangement of a plurality of three-dimensional digital tooth models for a dental restoration.

FIG. 2 shows an exemplary method for adjusting an arrangement of a plurality of three-dimensional digital tooth models for a dental restoration. In block 200, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 202, a first input is received, by which one of the three-dimensional digital tooth models is selected. In block 204, a second input is received, by which a modification of the selected one or more three-dimensional digital tooth models are selected.

In block 206, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

In block 210, adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 212, the resulting adjusted three-dimensional digital teeth model is provided for manufacturing the dental restoration.

Figure 3:
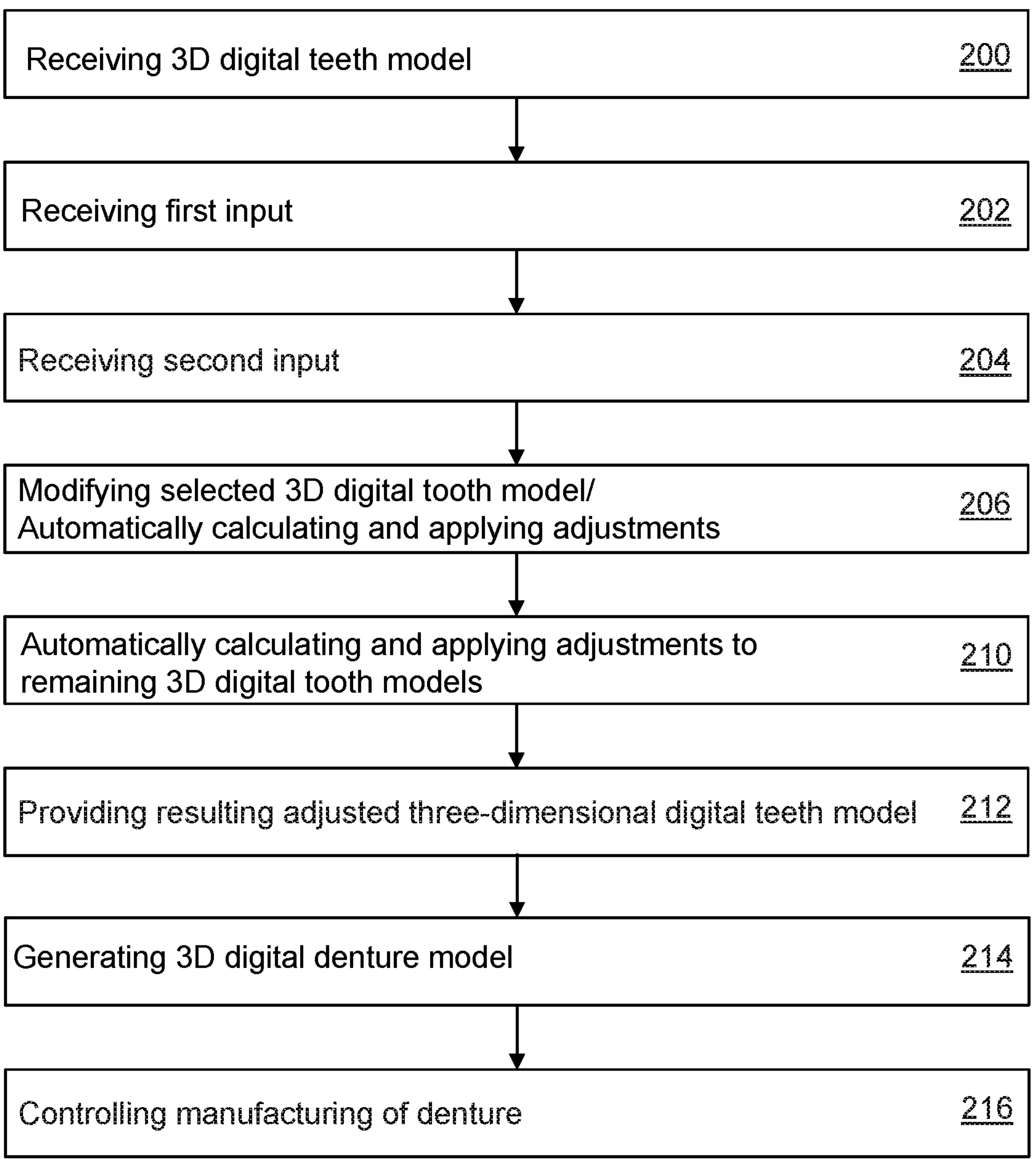
FIG. 3 shows a flowchart illustrating an exemplary method for adjusting an arrangement of a plurality of three-dimensional digital tooth models for a dental restoration.

FIG. 3 shows an exemplary method for adjusting an arrangement of a plurality of three-dimensional digital tooth models for a dental restoration and for controlling a manufacturing of the dental restoration. In block 200, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 202, a first input is received, by which one of the three-dimensional digital tooth models is selected. In block 204, a second input is received, by which a modification of the selected one or more three-dimensional digital tooth models are selected.

In block 206, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

In block 210, adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models.

The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 212, the resulting adjusted three-dimensional digital teeth model is provided for manufacturing the dental restoration. In block 214, a three-dimensional digital dental restoration model of the dental restoration to be manufactured is generated using the adjusted three-dimensional digital teeth model provided for manufacturing the dental restoration. In block 216, a manufacturing of the dental restoration is controlled using the three-dimensional digital dental restoration model as template. The manufactured dental restoration is a physical copy of the template.

Figure 4:
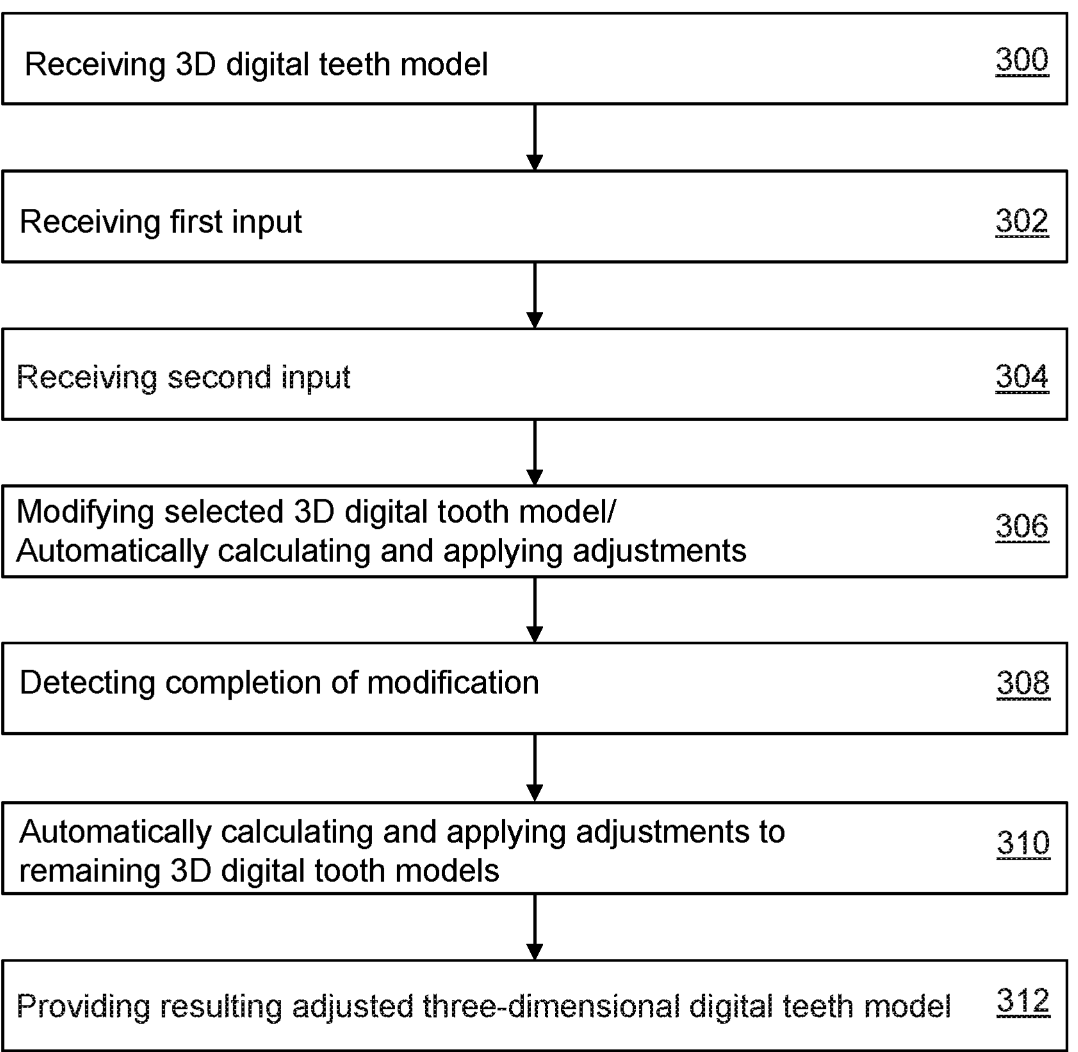
FIG. 4 shows a flowchart illustrating an exemplary method for adjusting an arrangement of a plurality of three-dimensional digital tooth models for a dental restoration.

FIG. 4 shows an exemplary method for adjusting an arrangement of a plurality of three-dimensional digital tooth models for a dental restoration.

In block 300, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 302, a first input is received, by which one of the three-dimensional digital tooth models is selected. In block 304, a second input is received, by which a modification of the selected one or more three-dimensional digital tooth models are selected.

In block 306, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

In block 308, a completion of the modification of the selected one or more three-dimensional digital tooth models are detected. Upon the completion detected in block 308, adjustments of a set of remaining three-dimensional digital tooth models of the three-dimensional digital teeth model are automatically calculated in block 310 depending on the modification of the selected one or more three-dimensional digital tooth models. The calculated adjustments are automatically applied to the remaining three-dimensional digital tooth models.

The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 312, the resulting adjusted three-dimensional digital teeth model is provided for manufacturing the dental restoration.

Figure 5:
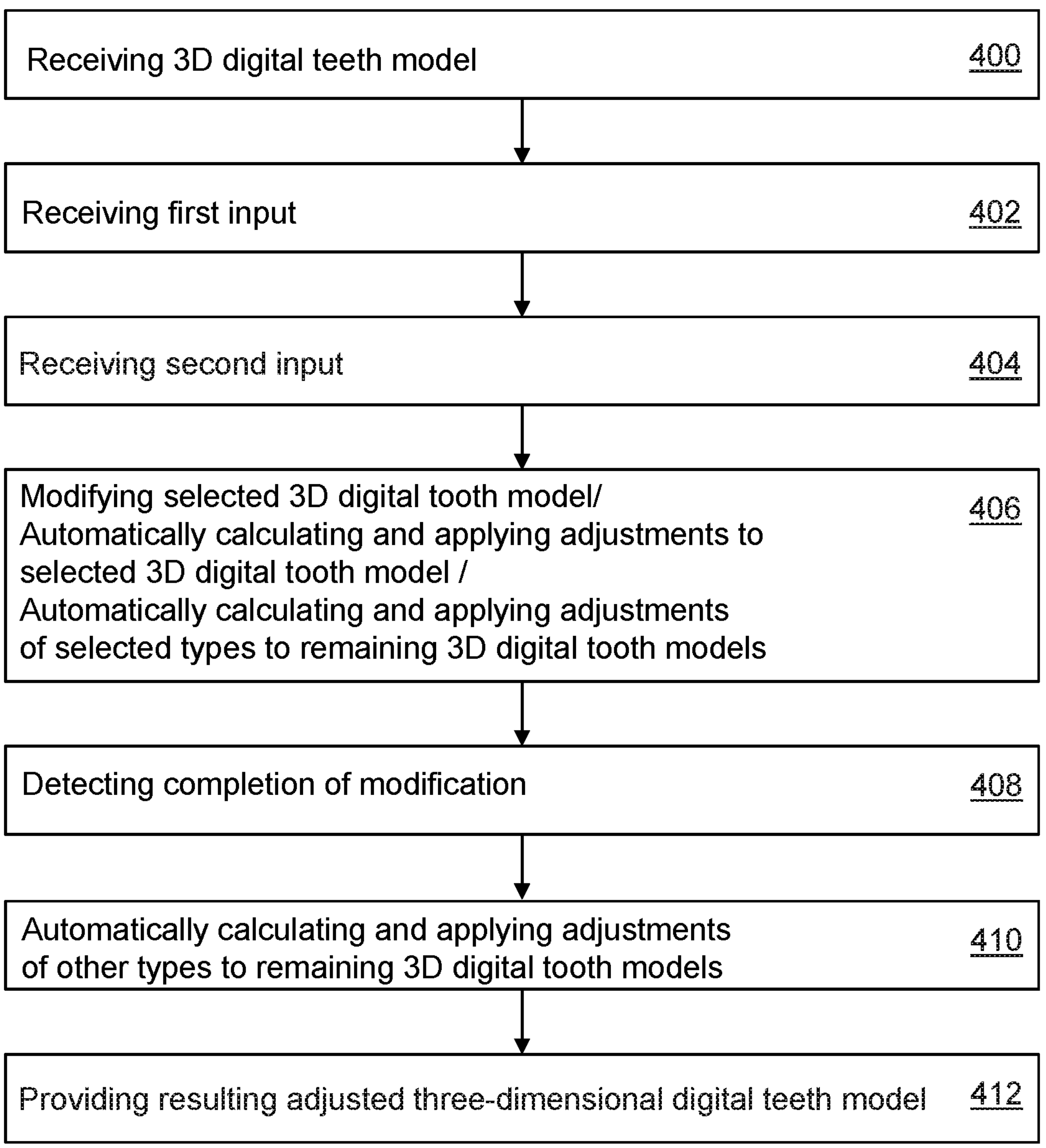
FIG. 5 shows a flowchart illustrating an exemplary method for adjusting an arrangement of a plurality of three-dimensional digital tooth models for a dental restoration.

FIG. 5 shows an exemplary method for adjusting an arrangement of a plurality of three-dimensional digital tooth models for a dental restoration. In block 400, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 402, a first input is received, by which one of the three-dimensional digital tooth models is selected. In block 404, a second input is received, by which a modification of the selected one or more three-dimensional digital tooth models are selected.

In block 406, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

Furthermore, a first set of types of adjustments may be selected. The selected first set of types of adjustments may, e.g., comprises pre-selected types of adjustments. For example, a third input may be received pre-selecting the pre-selected types of adjustments to be comprised by the selected first set of types of adjustments. Alternatively, types of adjustments to be comprised by the selected first set of types of adjustments may, e.g., be selected dynamically using estimates of processing power required for executing the different types of adjustments of the remaining three-dimensional digital tooth models. The types of adjustments to be comprised by the selected first set of types of adjustments may, e.g., be selected such that an estimated required overall processing power, which is required for executing the types of adjustments of the remaining three-dimensional digital tooth models selected to be comprised by the selected first set of types of adjustments and for modifying the selected one or more three-dimensional digital tooth models, is equal to or smaller than an available processing power of a computer system executing the method.

For the selected first set of types of adjustments the calculating and applying of adjustments of types comprised by the selected first set to the remaining three-dimensional digital tooth models may, e.g., be executed together with the modification of the selected one or more three-dimensional digital tooth models in block 406. The calculating and applying of the adjustments of other types of adjustments to the remaining three-dimensional digital tooth models may, e.g., be postponed and executed only upon the completion of the modification of the selected one or more three-dimensional digital tooth models.

In block 408, a completion of the modification of the selected one or more three-dimensional digital tooth models are detected. Upon the completion detected in block 408, the remaining adjustments of other types of adjustments of the set of remaining three-dimensional digital tooth models of the three-dimensional digital teeth model may be automatically calculated in block 410 depending on the modification of the selected one or more three-dimensional digital tooth models. The calculated remaining adjustments of other types of adjustments are automatically applied to the remaining three-dimensional digital tooth models.

The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 412, the resulting adjusted three-dimensional digital teeth model is provided for manufacturing the dental restoration.

Figure 6:
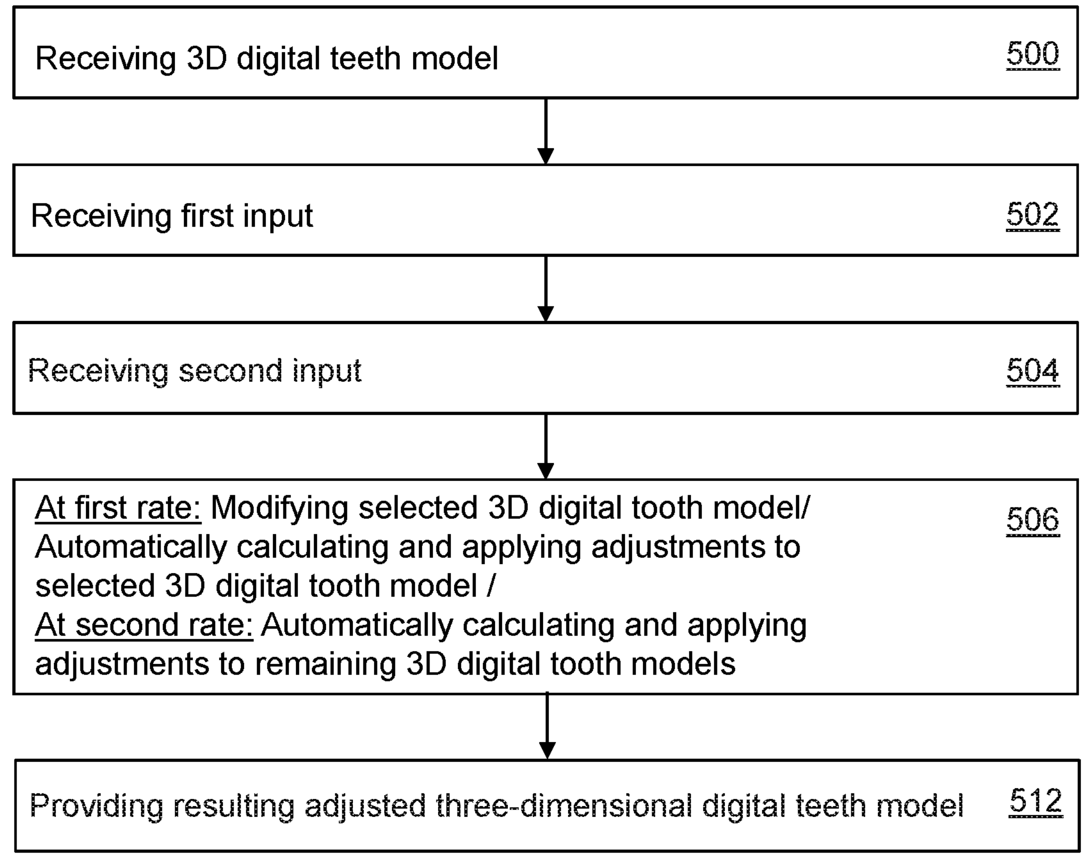
FIG. 6 shows a flowchart illustrating an exemplary method for adjusting an arrangement of a plurality of three-dimensional digital tooth models for a dental restoration.

FIG. 6 shows an exemplary method for adjusting an arrangement of a plurality of three-dimensional digital tooth models for a dental restoration. In block 500, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 502, a first input is received, by which one of the three-dimensional digital tooth models is selected. In block 504, a second input is received, by which a modification of the selected one or more three-dimensional digital tooth models are selected.

In block 506, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

Furthermore, adjustments of a set of remaining three-dimensional digital tooth models of the three-dimensional digital teeth model are automatically calculated in block 506 depending on the modification of the selected one or more three-dimensional digital tooth models. The calculated adjustments are automatically applied to the remaining three-dimensional digital tooth models. The automatically calculating and applying of the adjustments of the remaining three-dimensional digital tooth models is performed, while the selected one or more three-dimensional digital tooth models are modified according to the second input.

The calculating and applying of the adjustments of the geometric form of the selected one or more three-dimensional digital tooth models may, e.g., be executed in discrete steps at a first rate of executions per second, whereas the calculating and applying of the adjustments of the remaining three-dimensional digital tooth models is executed in discrete steps at a second rate of executions per second with the second rate being lower than the first rate. For example, the first rate may be a rate of at least 20 executions per second.

For example, the adjustments of the geometric form of the selected one or more three-dimensional digital tooth models are displayed using a display device in discrete steps at the first rate, while the at least part of the adjustments of the remaining three-dimensional digital tooth models are displayed on the display device in discrete steps at the second rate. For a transition between consecutive discrete steps of the adjustments of the remaining three-dimensional digital tooth models being displayed one of the following are used: an overlapping, a morphing.

For example, modifications/adjustments of individual three-dimensional digital tooth models of the three-dimensional digital teeth model may be displayable independently of each other, e.g., in discrete steps using different rates. For example, different frames may be displayed at the first rate or a higher rate. Each of the frames being displayed, which corresponds to the first rate, may show a discrete step of the adjustments of the geometric form of the selected one or more three-dimensional digital tooth models being calculated and applied at the same first rate. Each of the frames displayed, which corresponds to a lower second rate, may, e.g., show a discrete step of the adjustments of the remaining three-dimensional digital tooth models being automatically calculated and applied at the lower second rate.

For example, an individual three-dimensional digital tooth model may be displayed unaltered until an adjustment of the three-dimensional digital tooth model has been calculated and applied, which is then displayed as a discrete step. Thus, the changes the three-dimensional digital tooth model due to the adjustment may be applied from one frame to the other without any smoothening of the transition. In case the rate of calculating and applying adjustments of the respective three-dimensional digital tooth model is high enough, transitions between the discrete steps may still appear to be smooth to the human eye.

For example, a rate of calculating and applying of adjustments of an individual three-dimensional digital tooth model may be lower than a rate at which frames are displayed using a display device. Thus, instead of repeatedly displaying the unaltered three-dimensional digital tooth model on frames between consecutive steps of adjustments, the transition between these consecutive discrete steps of the adjustments may be smoothened.

For smoothening the transition between discrete steps, e.g., an overlapping may be used. Thus, for one or more frames in between the discrete steps the results of both steps, i.e., image of the respective individual three-dimensional digital tooth model with and without the respective adjustments, may be overlayed and displayed simultaneously.

For smoothening the transition between discrete steps, e.g., a dissolve overlapping may be used. Thus, a transition may be displayed, in which the respective individual three-dimensional digital tooth model with the respective adjustments of a consecutive discrete step fades over the respective individual three-dimensional digital tooth model without the respective adjustments. For the duration of the effect, e.g., on frames in between frames of the second rate, an image of the respective individual three-dimensional digital tooth model with and without the respective adjustments may be overlayed and displayed simultaneously. From frame to frame a degree of transparency of the image of the respective individual three-dimensional digital tooth model with without the respective adjustments may be increased, while a degree of transparency of the image of the respective individual three-dimensional digital tooth model with the respective adjustments may be decreased.

For smoothening the transition between discrete steps, e.g., a morphing may be used. Morphing refers to an effect that changes or morphs one frame or a section of a frame into another, i.e., a consecutive frame or section of a consecutive frame through a seamless transition. Thus, a transition may be displayed, in which the respective individual three-dimensional digital tooth model of one discrete step is morphed into the three-dimensional digital tooth model with the respective adjustments fades of a consecutive discrete step. For the duration of the effect, e.g., on frames in between frames of the second rate, the respective individual three-dimensional digital tooth model is displayed with changes resulting the morphing, i.e., with morphed features.

The morphing may, e.g., comprise distorting the respective individual three-dimensional digital tooth model of one discrete step at the same time that it faded into the three-dimensional digital tooth model with the respective adjustments fades of a consecutive discrete step. This may comprise marking corresponding points and/or vectors on the before state and after state of the respective individual three-dimensional digital tooth model, i.e., the respective individual three-dimensional digital tooth model without the adjustments of the consecutive discrete step having been applied and the respective individual three-dimensional digital tooth model with the adjustments of the consecutive discrete step having been applied.

In order to be able to display images of states of a three-dimensional digital tooth model at two consecutive discrete steps, the displaying may be time-delayed. For example, the displaying may be time delayed by the time difference between two consecutive discrete steps, e.g., two consecutive discrete steps according to the second rate. Thus, when displaying the images, the results of the calculating and applying of adjustments for both steps are available and may be used for smoothening the transition, e.g., using overlapping of morphing. For example, results of the automatic calculating and applying of adjustments of remaining three-dimensional digital tooth models of consecutive discrete steps of the second rate may be morphed into each other when they are finished to avoid sudden immediate jumps on the display device between each of these second-rate results. Instead, the user may see a smooth transition between the second rate results, even though the second rate may be lower than the first rate. The smoothness of the transition may thus even be comparable to transitions of first rate results.

A smoother displaying of transitions between discrete steps of calculation may, e.g., enable a more relaxed perception of results of the method, in particular by a user using the method over a longer period of time, e.g., one or more hours. Furthermore, a smoother displaying of transitions may, e.g., enable a more intuitive usage of the method by the user, since effects of inputs by the user may be more intuitively predictable for the user. Even a handling of an input device for providing the user input may thus be more intuitive and smoother for the user.

For example, a plurality of processing units is used for executing the method. The modifying of the selected one or more three-dimensional digital tooth models according to the second input and the automatically calculating of the adjustments of the remaining three-dimensional digital tooth models are parallelized. The parallelizing comprises an execution of the modifying of the selected one or more three-dimensional digital tooth models and the automatically calculating of the adjustments of the remaining three-dimensional digital tooth models using different processing units of the plurality of processing units.

By parallelizing the modifying of the selected one or more three-dimensional digital tooth models according to the second input and the automatically calculating of the adjustments of the remaining three-dimensional digital tooth models results may be calculated faster, enabling a smoother displaying of transitions between discrete steps of calculation. This may, e.g., enable a more relaxed perception of results of the method, in particular by a user using the method over a longer period of time, e.g., one or more hours. Furthermore, a smoother displaying of transitions may, e.g., enable a more intuitive usage of the method by the user, since effects of inputs by the user may be more intuitively predictable for the user. Even a handling of an input device for providing the user input may thus be more intuitive and smoother for the user.

For example, the plurality of processing units comprises one or more primary processing units and one or more secondary processing units. The primary processing units have larger processing powers than the secondary processing units. The primary processing units may, e.g., be configured for a faster calculating of adjustments of three-dimensional digital tooth models. The parallelizing comprises an execution of the modifying of the selected one or more three-dimensional digital tooth models at the first rate using one or more of the one or more primary processing units and an execution of the at least part of the adjustments of the remaining three-dimensional digital tooth models at the second rate using one or more of the one or more secondary processing units.

Examples may, e.g., enable a distribution of calculations, which are to be performed at the second rate, which is, e.g., slower than real time, on secondary processing units. Calculations, which are to be performed at the first rate, which is, e.g., fast enough to provide an impression of a real-time applying of adjustments, on primary processing units. Calculation may, e.g., be distributed in a second dynamic rate onto those secondary processing units to be worked out in the background for a preceding discrete step or configuration and presented onto the screen as soon as these background secondary processing units are finished.

The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 512, the resulting adjusted three-dimensional digital teeth model is provided for manufacturing the dental restoration.

Figure 7:
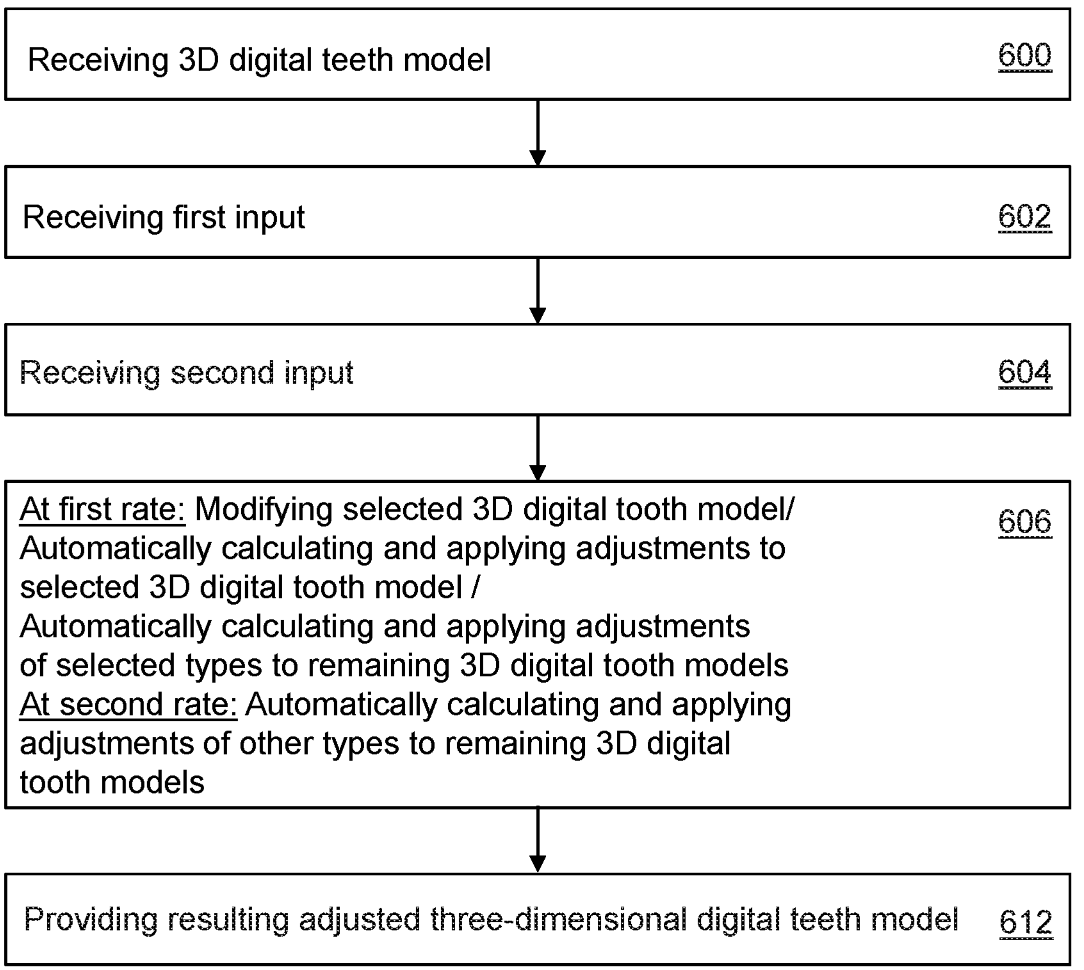
FIG. 7 shows a flowchart illustrating an exemplary method for adjusting an arrangement of a plurality of three-dimensional digital tooth models for a dental restoration.

FIG. 7 shows an exemplary method for adjusting an arrangement of a plurality of three-dimensional digital tooth models for a dental restoration. In block 600, a three-dimensional digital teeth model comprising the plurality of the three-dimensional digital tooth models is received. The three-dimensional digital teeth model defines an arrangement of a plurality of artificial teeth for the dental restoration. Each of the three-dimensional digital tooth models defines an individual artificial tooth of the plurality of artificial teeth.

In block 602, a first input is received, by which one of the three-dimensional digital tooth models is selected. In block 604, a second input is received, by which a modification of the selected one or more three-dimensional digital tooth models are selected.

In block 606, the selected one or more three-dimensional digital tooth models are modified according to the second input. The modification of the selected one or more three-dimensional digital tooth models may, e.g., comprise one or more of the following types of modification: a translational movement, a rotational movement, a scaling, a modification of a geometric form. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. The adjustments of the geometric form of the selected one or more three-dimensional digital tooth models may, e.g., comprise a cutting of one or more sections of the geometric form of the selected one or more three-dimensional digital tooth models. Alternatively, the adjustments of the geometric form of the selected one or more three-dimensional digital tooth models may, e.g., comprise a deforming of the geometric form of the selected one or more three-dimensional digital tooth models.

For example, the one or more first geometric criteria for the selected one or more three-dimensional digital tooth models comprise one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

Furthermore, a second set of types of adjustments may be selected. The selected second set of types of adjustments may, e.g., comprises pre-selected types of adjustments. For example, a fourth input may be received pre-selecting the pre-selected types of adjustments to be comprised by the selected second set of types of adjustments. Alternatively, types of adjustments to be comprised by the selected second set of types of adjustments may, e.g., be selected dynamically using estimates of processing power required for executing the different types of adjustments of the remaining three-dimensional digital tooth models. The types of adjustments to be comprised by the selected second set of types of adjustments may, e.g., be selected such that an estimated required overall processing power, which is required for executing the types of adjustments of the remaining three-dimensional digital tooth models selected to be comprised by the selected second set of types of adjustments and for modifying the selected one or more three-dimensional digital tooth models, is equal to or smaller than an available processing power of a computer system executing the method.

Adjustments of a set of remaining three-dimensional digital tooth models of the three-dimensional digital teeth model may be automatically calculated in block 606 as well depending on the modification of the selected one or more three-dimensional digital tooth models. The calculated adjustments are automatically applied to the remaining three-dimensional digital tooth models. The automatically calculating and applying of the adjustments of the remaining three-dimensional digital tooth models may be performed, while the selected one or more three-dimensional digital tooth models are modified according to the second input.

The calculating and applying of the adjustments of the geometric form of the selected one or more three-dimensional digital tooth models may, e.g., be executed in discrete steps at a first rate of executions per second. For example, the first rate may be a rate of at least 20 executions per second. For the selected first set of types of adjustments the calculating and applying of adjustments of types comprised by the selected first set to the remaining three-dimensional digital tooth models may, e.g., be executed in discrete steps at the first rate of executions per second as well. However, the calculating and applying of the adjustments of other types of adjustments to the remaining three-dimensional digital tooth models may, e.g., executed in discrete steps at a second rate of executions per second with the second rate being lower than the first rate.

The adjustments of the remaining three-dimensional digital tooth models may, e.g., comprise one or more of the following types of adjustments: a translational movement, a rotational movement, a scaling, an adjustment of geometric forms of the remaining three-dimensional digital tooth models. The adjustments of the geometric form of the remaining three-dimensional digital tooth models may, e.g., comprise a cutting of one or more sections of the geometric form of the respective remaining three-dimensional digital tooth models of the selected one or more three-dimensional digital tooth models. Alternatively, the adjustments of the geometric form of the remaining three-dimensional digital tooth models may, e.g., comprise a deforming of the geometric form of the respective remaining three-dimensional digital tooth model.

For example, for each of the remaining three-dimensional tooth models a degree of the adjustments of the respective remaining three-dimensional digital tooth model is weighted based on a distance of the respective remaining three-dimensional digital tooth model for which the respective adjustment is calculated from the selected one or more three-dimensional digital tooth models.

The adjustments of geometric forms of the remaining three-dimensional digital tooth models may, e.g., be calculated in order to satisfy one or more second geometric criteria for the remaining three-dimensional digital tooth models. For example, the one or more second geometric criteria for the remaining three-dimensional digital tooth models comprise one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

In block 612, the resulting adjusted three-dimensional digital teeth model is provided for manufacturing the dental restoration.

Figure 8:
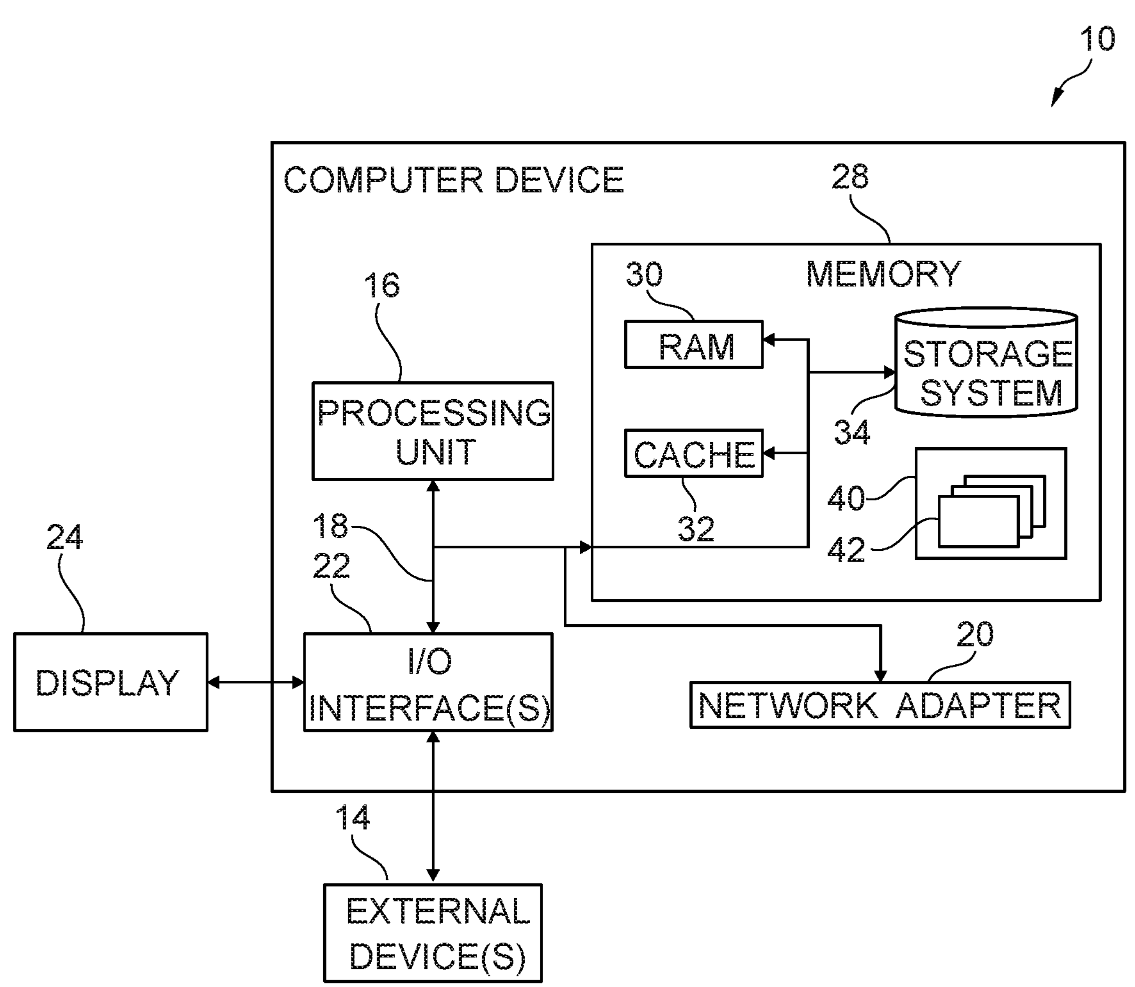
FIG. 8 shows an exemplary computer device for adjusting an arrangement of a plurality of three-dimensional digital tooth models for a dental restoration.

FIG. 8 shows a schematic diagram of an exemplary computer device 10 for adjusting an arrangement of a plurality of three-dimensional digital tooth models for a dental restoration. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 8, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include a three-dimensional digital teeth model comprising the plurality of the three-dimensional digital tooth models. The three-dimensional digital teeth model defines an arrangement of a plurality of artificial teeth for the dental restoration, each of the three-dimensional digital tooth models defining an individual artificial tooth of the plurality of artificial teeth.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may be configured for adjusting an arrangement of a plurality of three-dimensional digital tooth models for a dental restoration. The program modules 42 may, e.g., be configured to control the computer device 10 to receive a three-dimensional digital teeth model comprising the plurality of the three-dimensional digital tooth models. The three-dimensional digital teeth model defines an arrangement of a plurality of artificial teeth for the dental restoration. Each of the three-dimensional digital tooth models defines an individual artificial tooth of the plurality of artificial teeth. A first input is received selecting one or more of the three-dimensional digital tooth models. A second input is received defining a modification of the selected one or more three-dimensional digital tooth models. The selected one or more three-dimensional digital tooth models are modified according to the second input. While the selected one or more three-dimensional digital tooth models are modified according to the second input, adjustments of a geometric form of the selected one or more three-dimensional digital tooth models are automatically calculated and automatically applied to the selected one or more three-dimensional digital tooth models. The adjustments are calculated in order to satisfy one or more first geometric criteria for the selected one or more three-dimensional digital tooth models. Adjustments of a set of remaining three-dimensional digital tooth models of the three-dimensional digital teeth model are automatically calculated depending on the modification of the selected one or more three-dimensional digital tooth models. The calculated adjustments are automatically applied to the remaining three-dimensional digital tooth models. The resulting adjusted three-dimensional digital teeth model is provided for manufacturing the dental restoration.

One of the program modules 42 may, e.g., further be configured for generating a three-dimensional digital dental restoration model of the dental restoration to be manufactured using the adjusted three-dimensional digital teeth model provided for manufacturing the dental restoration. One of the program modules 42 may, e.g., be configured to train a machine learning module to be trained. The machine learning module to be trained may, e.g., be an untrained machine learning module, a pre-trained machine learning module or a partially trained machine learning module.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

Figure 9:
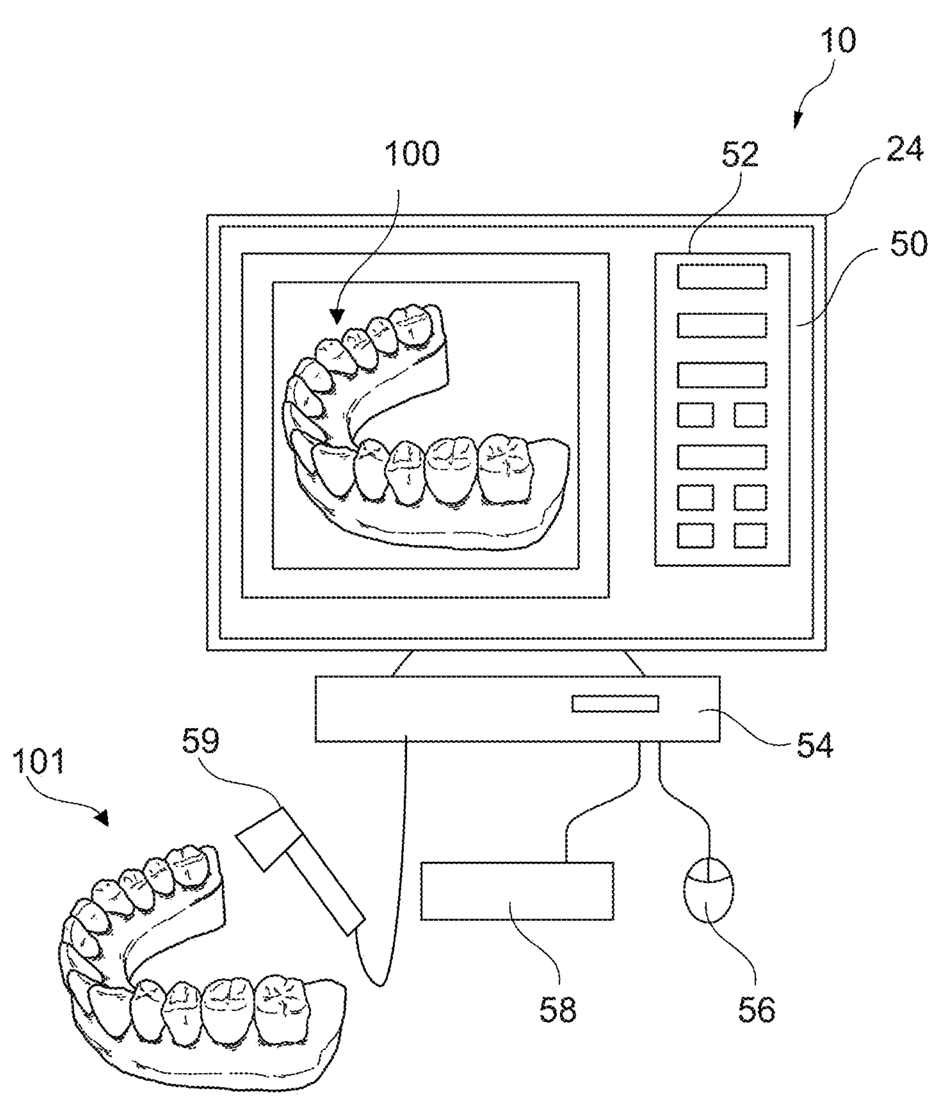
FIG. 9 shows an exemplary computer device for adjusting an arrangement of a plurality of three-dimensional digital tooth models for a dental restoration.

FIG. 9 shows an exemplary computer device 10 for adjusting an arrangement of a plurality of three-dimensional digital tooth models for a dental restoration. The computer device 10 may, e.g., be configured as shown in FIG. 8. The computer device 10 may comprise a hardware component 54 comprising one or more processors as well as a memory storing machine-executable program instructions. Execution of the program instructions by the one or more processors may cause the one or more processors to control the computer device 10 to adjust an arrangement of a plurality of three-dimensional digital tooth models for a dental restoration using a first input selecting a three-dimensional digital tooth model comprised by the three-dimensional digital teeth model and a second input defining a modification of the selected one or more three-dimensional digital tooth models.

The computer device 10 may further comprise one or more input devices, like a keyboard 58 and a mouse 56, enabling a user to interact with the computer device 10. The input devices may, e.g., be configured for receiving the first input selecting a three-dimensional digital tooth model comprised by the three-dimensional digital teeth model and a second input defining a modification of the selected one or more three-dimensional digital tooth models. Furthermore, the computer device 10 may comprise one or more output devices, like a display 24 providing a graphical user interface 50 with control elements 52, e.g., GUI elements, enabling the user to control the adjusting of the arrangement of a plurality of three-dimensional digital tooth models for the dental restoration. The computer device 10 may further comprise an intraoral scanner 59, e.g., configured for scanning a patient's oral cavity comprising, e.g., one or two dental arches 101 of a patient, i.e., mandible and/or a maxilla of the patient, and generating, e.g., a three-dimensional digital teeth model 100 comprising a plurality of three-dimensional digital tooth models.

Figure 10:
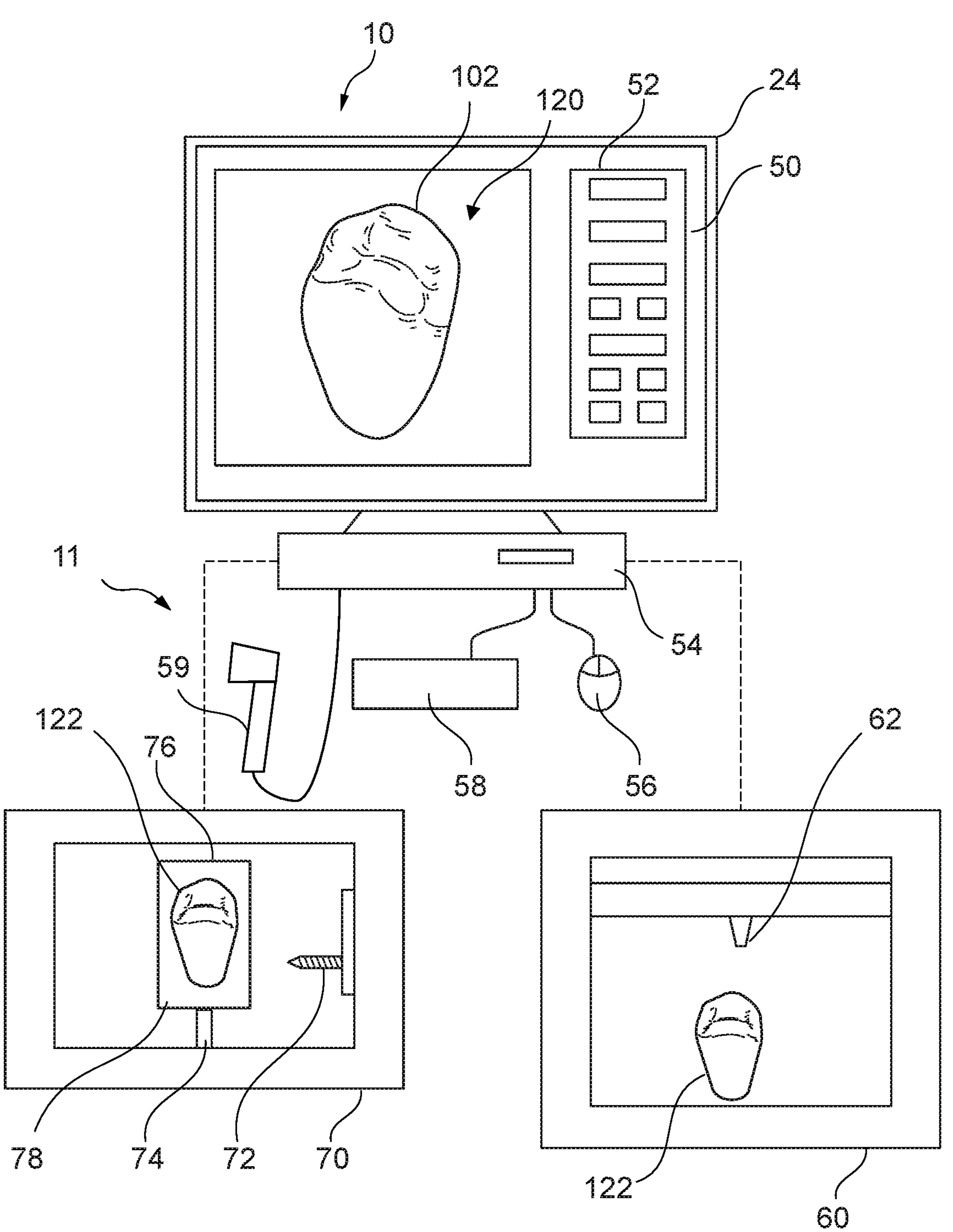
FIG. 10 exemplary system for manufacturing a dental restoration using an adjusted three-dimensional digital teeth model.

FIG. 10 shows an exemplary manufacturing system 11 for manufacturing a dental restoration or at least one or more elements 122 of a dental restoration. A three-dimensional digital dental restoration model defining one or more elements of the dental restoration, like e.g., an artificial tooth 122, may be provided. This three-dimensional digital dental restoration model may, e.g., be used as a template for manufacturing the dental restoration and/or dental restoration elements, e.g., the artificial tooth 122 as a physical copy of the template. For generating the dental restoration model comprising the one or more dental restoration elements, e.g., the adjusted three-dimensional digital teeth model may be used.

The manufacturing system 11 may comprise the computer device 10 of FIG. 8. The computer device 10 may further be configured to control one or more manufacturing devices 60, 70. For example, the manufacturing system 11 may comprise a manufacturing device in form of a machining device 70 controlled by the computer device 10. The machining device 70 may be configured to machining a blank 76 using one or more machining tools 72. The blank 76 of raw material 78, may be provided using a holding device 74 and cut into a desired shape and size of the element to be manufactured, e.g., the artificial tooth 122. The machining tool 72 may, e.g., be a milling tool.

For example, the manufacturing system 11 may comprise a manufacturing device in form of a 3D printing device 60. The 3D printing device 60 may be controlled by the computer device and configured to print an element to be manufactured, e.g., the dental restoration element. The 3D printing device 60 may comprise a printing element 62 configured to print the respective 10 element, like the artificial tooth 122, layer by layer. The printing element 62 may, e.g., comprise a nozzle configured for distributing printing material.

In case the element to be manufactured using the 3D printing device 60 is made using metal, the 3D printing device 60 may, e.g., be configured for executing selective laser sintering or melting. Selective laser sintering uses a laser for sintering a powdered material, aiming the laser automatically at points in space defined by a three-dimensional digital model of the element to be printed. The laser energy may result in a local sintering or melting of the powdered material, binding the material together to create a solid structure. For example, the printing element 62 of the 3D printing device 60 may comprise a laser and/or a distributing device for distributing the powdered material.

For example, the three-dimensional dental restoration model may be used as a positive to define a negative of the physical dental restoration element in form of a negative three-dimensional digital dental restoration model. The negative three-dimensional digital dental restoration model may be used to manufacture, e.g., using machining device 70 or 3D printing device 60, a casting matrix. The casting matrix may be configured for casting the physical artificial tooth 122 by inserting restoration material into the casting matrix and curing the inserted restoration material.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific examples, it should be understood that the invention is not limited to these examples only and that many variations of these examples may be readily envisioned by the skilled person after having read the present disclosure. The invention may thus further be described without limitation and by way of example only by the following examples. The following examples may contain preferred embodiments. Accordingly, the term "feature combination" as used therein may refer to an example or such a "preferred embodiment".

1. A computer-implemented method for adjusting an arrangement of a plurality of three-dimensional digital tooth models for a dental restoration, the method comprising:

receiving a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receiving a first input selecting one or more of the three-dimensional digital tooth models, receiving a second input defining a modification of the selected one or more three-dimensional digital tooth models, modifying the selected one or more three-dimensional digital tooth models according to the second input, while the selected one or more three-dimensional digital tooth models are modified according to the second input, automatically calculating adjustments of a geometric form of the selected one or more three-dimensional digital tooth models and automatically applying the calculated adjustments to the selected one or more three-dimensional digital tooth models, the adjustments being calculated in order to satisfy one or more first geometric criteria for the selected one or more three-dimensional digital tooth models, automatically calculating adjustments of a set of remaining three-dimensional digital tooth models of the three-dimensional digital teeth model depending on the modification of the selected one or more three-dimensional digital tooth models, automatically applying the calculated adjustments to the remaining three-dimensional digital tooth models, providing the resulting adjusted three-dimensional digital teeth model for manufacturing the dental restoration.

2. The method of feature combination 1, the calculating and applying of at least a part of the adjustments of the remaining three-dimensional digital tooth models being executed upon a completion of the modification of the selected one or more three-dimensional digital tooth models.

3. The method of feature combination 2, for a selected first set of types of adjustments the calculating and applying of adjustments of types comprised by the selected first set to the remaining three-dimensional digital tooth models being executed together with the modification of the selected one or more three-dimensional digital tooth models, whereas the calculating and applying of the adjustments of other types of adjustments to the remaining three-dimensional digital tooth models being executed upon the completion of the modification of the selected one or more three-dimensional digital tooth models.

4. The method of feature combination 3, the selected first set of types of adjustments comprising pre-selected types of adjustments.

5. The method of feature combination 3, further comprising dynamically selecting types of adjustments to be comprised by the selected first set of types of adjustments using estimates of processing power required for executing the different types of adjustments of the remaining three-dimensional digital tooth models with an estimated required overall processing power, which is required for executing the types of adjustments of the remaining three-dimensional digital tooth models selected to be comprised by the selected first set of types of adjustments and for modifying the selected one or more three-dimensional digital tooth models, being equal to or smaller than an available processing power of a computer system executing the method.

6. The method of feature combination 2, the calculating and applying of all the adjustments of the remaining three-dimensional digital tooth models being executed upon a completion of the modification of the selected one or more three-dimensional digital tooth models.

7. The method of feature combination 1, the calculating and applying of the adjustments of the geometric form of the selected one or more three-dimensional digital tooth models being executed in discrete steps at a first rate of executions per second, the calculating and applying of at least a part of the adjustments of the remaining three-dimensional digital tooth models being executed in discrete steps at a second rate of executions per second with the second rate being lower than the first rate, the automatically calculating of the adjustments of the remaining three-dimensional digital tooth models being performed, while the selected one or more three-dimensional digital tooth models are modified according to the second input.

8. The method of feature combination 7, the first rate being a rate of at least 20 executions per second.

9. The method of any of feature combinations 7 to 8, for a selected second set of types of adjustments the calculating and applying of adjustments of types comprised by the selected second set to the remaining three-dimensional digital tooth models being executed at the first rate, whereas the calculating and applying of the adjustments of other types of adjustments to the remaining three-dimensional digital tooth models being executed at the second rate.

10. The method of feature combination 9, the selected second set of types of adjustments comprising pre-selected types of adjustments.

11. The method of feature combination 9, further comprising dynamically selecting types of adjustments to be comprised by the selected second set of types of adjustments using estimates of processing power required for executing the different types of adjustments of the remaining three-dimensional digital tooth models with an estimated required overall processing power, which is required for executing the types of adjustments of the remaining three-dimensional digital tooth models selected to be comprised by the selected second set of types of adjustments and for modifying the selected one or more three-dimensional digital tooth models, being equal to or smaller than the available processing power of the computer system executing the method.

12. The method of any of feature combinations 7 to 8, the calculating and applying of all the adjustments of the remaining three-dimensional digital tooth models being executed with the second rate.

13. The method of any of feature combinations 7 to 12, the adjustments of the geometric form of the selected one or more three-dimensional digital tooth models being displayed using a display device in discrete steps at the first rate, while the at least part of the adjustments of the remaining three-dimensional digital tooth models being displayed on the display device in discrete steps at the second rate, for a transition between consecutive discrete steps of the adjustments of the remaining three-dimensional digital tooth models being displayed one of the following being used: an overlapping, a morphing.

14. The method of any of feature combinations 7 to 13, a plurality of processing units being used for executing the method, the modifying of the selected one or more three-dimensional digital tooth models according to the second input and the automatically calculating of the adjustments of the remaining three-dimensional digital tooth models being parallelized, the parallelizing comprising an execution of the modifying of the selected one or more three-dimensional digital tooth models and the automatically calculating of the adjustments of the remaining three-dimensional digital tooth models using different processing units of the plurality of processing units.

15. The method of feature combination 14, the plurality of processing units comprising one or more primary processing units and one or more secondary processing units, the primary processing units having larger processing powers than the secondary processing units, the parallelizing comprising an execution of the modifying of the selected one or more three-dimensional digital tooth models at the first rate using one or more of the one or more primary processing units and an execution of the at least part of the adjustments of the remaining three-dimensional digital tooth models at the second rate using one or more of the one or more secondary processing units.

16. The method of any of the preceding feature combinations, the modification of the selected one or more three-dimensional digital tooth models comprising one or more of the following types of modification: a translational movement, a rotational movement, a scaling, a modification of a geometric form.

17. The method of any of the previous feature combinations, the one or more first geometric criteria for the selected one or more three-dimensional digital tooth models comprising one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

18. The method of any of the previous feature combinations, the adjustments of the geometric form of the selected one or more three-dimensional digital tooth models comprising one or more of the following types of adjustments: a cutting of one or more sections of the geometric form of the selected one or more three-dimensional digital tooth models, a deforming of the geometric form of the selected one or more three-dimensional digital tooth models.

19. The method of any of the previous feature combinations, the adjustments of the remaining three-dimensional digital tooth models comprising one or more of the following types of adjustments: a translational movement, a rotational movement, a scaling, an adjustment of geometric forms of the remaining three-dimensional digital tooth models.

20. The method of feature combination 19, the adjustments of geometric forms of the remaining three-dimensional digital tooth models being calculated in order to satisfy one or more second geometric criteria for the remaining three-dimensional digital tooth models.

21. The method of feature combination 20, the one or more second geometric criteria for the remaining three-dimensional digital tooth models comprising one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

22. The method of any of feature combinations 19 to 21, the adjustments of the geometric forms of the remaining three-dimensional digital tooth models comprising one or more of the following types of adjustments: a cutting of one or more sections of the geometric form of the respective remaining three-dimensional digital tooth model, a deforming of the geometric form of the respective remaining three-dimensional digital tooth model.

23. The method of any of the previous feature combinations, for each of the remaining three-dimensional tooth models a degree of the adjustments of the respective remaining three-dimensional digital tooth model being weighted based on a distance of the respective remaining three-dimensional digital tooth model for which the respective adjustment is calculated from the selected one or more three-dimensional digital tooth models.

24. The method of any of the previous feature combinations, the method further comprising:

generating a three-dimensional digital dental restoration model of the dental restoration to be manufactured using the adjusted three-dimensional digital teeth model provided for manufacturing the dental restoration, controlling a manufacturing of the dental restoration using the three-dimensional digital dental restoration model as template, the manufactured dental restoration being a physical copy of the template.

25. A computer program product for adjusting an arrangement of a plurality of three-dimensional digital tooth models for a dental restoration, the computer program product comprising a computer readable storage medium having program instructions embodied therewith, the program instructions being executable by a processor of a computer device to cause the computer device to:

receive a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receive a first input selecting one or more of the three-dimensional digital tooth models, receive a second input defining a modification of the selected one or more three-dimensional digital tooth models, modify the selected one or more three-dimensional digital tooth models according to the second input, while the selected one or more three-dimensional digital tooth models are modified according to the second input, automatically calculate adjustments of a geometric form of the selected one or more three-dimensional digital tooth models and automatically apply the calculated adjustments to the selected one or more three-dimensional digital tooth models, the adjustments being calculated in order to satisfy one or more first geometric criteria for the selected one or more three-dimensional digital tooth models, automatically calculate adjustments of a set of remaining three-dimensional digital tooth models of the three-dimensional digital teeth model depending on the modification of the selected one or more three-dimensional digital tooth models, automatically apply the calculated adjustments to the remaining three-dimensional digital tooth models, provide the resulting adjusted three-dimensional digital teeth model for manufacturing the dental restoration.

26. A computer program for adjusting an arrangement of a plurality of three-dimensional digital tooth models for a dental restoration, the computer program comprising program instructions, the program instructions being executable by a processor of a computer device to cause the computer device to:

receive a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receive a first input selecting one or more of the three-dimensional digital tooth models, receive a second input defining a modification of the selected one or more three-dimensional digital tooth models, modify the selected one or more three-dimensional digital tooth models according to the second input, while the selected one or more three-dimensional digital tooth models are modified according to the second input, automatically calculate adjustments of a geometric form of the selected one or more three-dimensional digital tooth models and automatically apply the calculated adjustments to the selected one or more three-dimensional digital tooth models, the adjustments being calculated in order to satisfy one or more first geometric criteria for the selected one or more three-dimensional digital tooth models, automatically calculate adjustments of a set of remaining three-dimensional digital tooth models of the three-dimensional digital teeth model depending on the modification of the selected one or more three-dimensional digital tooth models, automatically apply the calculated adjustments to the remaining three-dimensional digital tooth models, provide the resulting adjusted three-dimensional digital teeth model for manufacturing the dental restoration.

27. A computer device for adjusting an arrangement of a plurality of three-dimensional digital tooth models for a dental restoration, the computer device comprising a processor and a memory storing program instructions executable by the processor, execution of the program instructions by the processor causing the computer device to:

receive a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receive a first input selecting one or more of the three-dimensional digital tooth models, receive a second input defining a modification of the selected one or more three-dimensional digital tooth models, modify the selected one or more three-dimensional digital tooth models according to the second input, while the selected one or more three-dimensional digital tooth models are modified according to the second input, automatically calculate adjustments of a geometric form of the selected one or more three-dimensional digital tooth models and automatically apply the calculated adjustments to the selected one or more three-dimensional digital tooth models, the adjustments being calculated in order to satisfy one or more first geometric criteria for the selected one or more three-dimensional digital tooth models, automatically calculate adjustments of a set of remaining three-dimensional digital tooth models of the three-dimensional digital teeth model depending on the modification of the selected one or more three-dimensional digital tooth models, automatically apply the calculated adjustments to the remaining three-dimensional digital tooth models, provide the resulting adjusted three-dimensional digital teeth model for manufacturing the dental restoration.

28. A manufacturing system comprising the computer device of feature combination 27, the manufacturing system further comprising one or more manufacturing devices configured for manufacturing a dental restoration, execution of the program instructions by the processor further causing the computer device to generate a three-dimensional digital dental restoration model of the dental restoration to be manufactured using the adjusted three-dimensional digital teeth model provided for manufacturing the dental restoration, execution of the program instructions by the processor further causing the computer device to control the one or more manufacturing devices to manufacture the dental restoration using the three-dimensional digital dental restoration model as template, the manufactured dental restoration being a physical copy of the template.

REFERENCE SIGNS LIST

10 computer device
11 manufacturing system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
59 scanner
60 3D printing device
62 printing element
70 machining device
72 machining tool
74 holding device
76 blank
78 restoration material
100 3D digital teeth model
101 dental arch
102 3D digital tooth model
104 3D digital tooth model
110 3D digital teeth model
112 3D digital model of antagonist
114 3D digital model of antagonist
120 3D digital dental restoration model
122 artificial tooth

The invention claimed is:

1. A computer-implemented method for adjusting an arrangement of a plurality of three-dimensional digital tooth models for a dental restoration, the method comprising:

receiving a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receiving a first input selecting one or more of the three-dimensional digital tooth models, receiving a second input defining a modification of the selected one or more three-dimensional digital tooth models, modifying the selected one or more three-dimensional digital tooth models according to the second input, while the selected one or more three-dimensional digital tooth models are modified according to the second input, automatically calculating adjustments of a geometric form of the selected one or more three-dimensional digital tooth models and automatically applying the calculated adjustments to the selected one or more three-dimensional digital tooth models, the adjustments being calculated in order to satisfy one or more first geometric criteria for the selected one or more three-dimensional digital tooth models, the adjustments of the geometric form of the selected one or more three-dimensional digital tooth models comprising one or more of the following: a deforming of the geometric form, a structural changing of the geometric form, automatically calculating adjustments of a set of remaining three-dimensional digital tooth models of the three-dimensional digital teeth model depending on the modification of the selected one or more three-dimensional digital tooth models, automatically applying the calculated adjustments to the remaining three-dimensional digital tooth models, providing the resulting adjusted three-dimensional digital teeth model for manufacturing the dental restoration.

2. The method of claim 1, the calculating and applying of at least a part of the adjustments of the remaining three-dimensional digital tooth models being executed upon a completion of the modification of the selected one or more three-dimensional digital tooth models.

3. The method of claim 2, for a selected first set of types of adjustments the calculating and applying of adjustments of types comprised by the selected first set to the remaining three-dimensional digital tooth models being executed together with the modification of the selected one or more three-dimensional digital tooth models, whereas the calculating and applying of the adjustments of other types of adjustments to the remaining three-dimensional digital tooth models being executed upon the completion of the modification of the selected one or more three-dimensional digital tooth models.

4. The method of claim 3, the selected first set of types of adjustments comprising pre-selected types of adjustments.

5. The method of claim 3, further comprising dynamically selecting types of adjustments to be comprised by the selected first set of types of adjustments using estimates of processing power required for executing the different types of adjustments of the remaining three-dimensional digital tooth models with an estimated required overall processing power, which is required for executing the types of adjustments of the remaining three-dimensional digital tooth models selected to be comprised by the selected first set of types of adjustments and for modifying the selected one or more three-dimensional digital tooth models, being equal to or smaller than an available processing power of a computer system executing the method.

6. The method of claim 2, the calculating and applying of all the adjustments of the remaining three-dimensional digital tooth models being executed upon a completion of the modification of the selected one or more three-dimensional digital tooth models.

7. The method of claim 1, the calculating and applying of the adjustments of the geometric form of the selected one or more three-dimensional digital tooth models being executed in discrete steps at a first rate of executions per second, the calculating and applying of at least a part of the adjustments of the remaining three-dimensional digital tooth models being executed in discrete steps at a second rate of executions per second with the second rate being lower than the first rate, the automatically calculating of the adjustments of the remaining three-dimensional digital tooth models being performed, while the selected one or more three-dimensional digital tooth models are modified according to the second input.

8. The method of claim 7, the first rate being a rate of at least 20 executions per second.

9. The method of claim 7, for a selected second set of types of adjustments the calculating and applying of adjustments of types comprised by the selected second set to the remaining three-dimensional digital tooth models being executed at the first rate, whereas the calculating and applying of the adjustments of other types of adjustments to the remaining three-dimensional digital tooth models being executed at the second rate.

10. The method of claim 9, the selected second set of types of adjustments comprising pre-selected types of adjustments.

11. The method of claim 9, further comprising dynamically selecting types of adjustments to be comprised by the selected second set of types of adjustments using estimates of processing power required for executing the different types of adjustments of the remaining three-dimensional digital tooth models with an estimated required overall processing power, which is required for executing the types of adjustments of the remaining three-dimensional digital tooth models selected to be comprised by the selected second set of types of adjustments and for modifying the selected one or more three-dimensional digital tooth models, being equal to or smaller than an available processing power of a computer system executing the method.

12. The method of claim 7, the calculating and applying of all the adjustments of the remaining three-dimensional digital tooth models being executed with the second rate.

13. The method of claim 7, the adjustments of the geometric form of the selected one or more three-dimensional digital tooth models being displayed using a display device in discrete steps at the first rate, while the at least part of the adjustments of the remaining three-dimensional digital tooth models being displayed on the display device in discrete steps at the second rate, for a transition between consecutive discrete steps of the adjustments of the remaining three-dimensional digital tooth models being displayed one of the following being used: an overlapping, a morphing.

14. The method of claim 7, a plurality of processing units being used for executing the method, the modifying of the selected one or more three-dimensional digital tooth models according to the second input and the automatically calculating of the adjustments of the remaining three-dimensional digital tooth models being parallelized, the parallelizing comprising an execution of the modifying of the selected one or more three-dimensional digital tooth models and the automatically calculating of the adjustments of the remaining three-dimensional digital tooth models using different processing units of the plurality of processing units.

15. The method of claim 14, the plurality of processing units comprising one or more primary processing units and one or more secondary processing units, the primary processing units having larger processing powers than the secondary processing units, the parallelizing comprising an execution of the modifying of the selected one or more three-dimensional digital tooth models at the first rate using one or more of the one or more primary processing units and an execution of the at least part of the adjustments of the remaining three-dimensional digital tooth models at the second rate using one or more of the one or more secondary processing units.

16. The method of claim 1, the modification of the selected one or more three-dimensional digital tooth models comprising one or more of the following types of modification: a translational movement, a rotational movement, a scaling, a modification of a geometric form.

17. The method of claim 1, the one or more first geometric criteria for the selected one or more three-dimensional digital tooth models comprising one or more of the following criteria: no intersection of the selected one or more three-dimensional digital tooth models with a three-dimensional digital antagonist model of an antagonist of the selected one or more three-dimensional digital tooth models in occlusion, no intersection of the selected one or more three-dimensional digital tooth models with an occlusal offset surface of an occlusal surface of the three-dimensional digital antagonist model in occlusion, preserving an occlusal contact of the selected one or more three-dimensional digital tooth models with the three-dimensional digital antagonist model in occlusion, preserving an occlusal contact of the selected one or more three-dimensional digital tooth models with the occlusal offset surface of the occlusal surface of the three-dimensional digital antagonist model in occlusion, no intersection of the selected one or more three-dimensional digital tooth models with a three-dimensional digital tooth model of an approximal tooth of the selected one or more three-dimensional digital tooth models, no intersection of the selected one or more three-dimensional digital tooth models with an approximal offset surface of an approximal surface of the three-dimensional digital tooth model of the approximal tooth, preserving a contact of the selected one or more three-dimensional digital tooth models with the three-dimensional digital tooth model of the approximal tooth, preserving a contact of the selected one or more three-dimensional digital tooth models with the approximal offset surface of the approximal surface of the three-dimensional digital tooth model of the approximal tooth, preserving of a minimum thickness of the selected one or more three-dimensional digital tooth models.

18. The method of claim 1, the adjustments of the geometric form of the selected one or more three-dimensional digital tooth models comprise a cutting of one or more sections of the geometric form of the selected one or more three-dimensional digital tooth models.

19. The method of claim 1, the adjustments of the remaining three-dimensional digital tooth models comprising one or more of the following types of adjustments: a translational movement, a rotational movement, a scaling, an adjustment of geometric forms of the remaining three-dimensional digital tooth models.

20. The method of claim 19, the adjustments of geometric forms of the remaining three-dimensional digital tooth models being calculated in order to satisfy one or more second geometric criteria for the remaining three-dimensional digital tooth models.

21. The method of claim 20, the one or more second geometric criteria for the remaining three-dimensional digital tooth models comprising one or more of the following criteria: no intersection of the respective remaining three-dimensional digital tooth model with a three-dimensional digital antagonist model of an antagonist of the respective remaining three-dimensional digital tooth model, no intersection of the respective remaining three-dimensional digital tooth model with an occlusal offset surface of an occlusal surface of the three-dimensional digital antagonist model of the antagonist of the respective remaining three-dimensional digital tooth model, preserving an occlusal contact of the respective remaining three-dimensional digital tooth model with the three-dimensional digital antagonist model of the antagonist of the respective remaining three-dimensional digital tooth model in occlusion, preserving an occlusal contact of the selected one or more three-dimensional digital tooth models with the occlusal offset surface of the occlusal surface of the three-dimensional digital antagonist model of the antagonist of the respective remaining three-dimensional digital tooth model in occlusion, no intersection of the selected one or more three-dimensional digital tooth models with a three-dimensional digital tooth model of an approximal tooth of the respective remaining three-dimensional digital tooth model, no intersection of an approximal offset surface of an approximal surface of the respective remaining three-dimensional digital tooth model with an approximal offset surface of an approximal surface of the three-dimensional digital tooth model of the approximal tooth of the respective remaining three-dimensional digital tooth model, preserving a contact of the approximal offset surface of the approximal surface of the respective remaining three-dimensional digital tooth model with the approximal offset surface of the approximal surface of the three-dimensional digital tooth model of the approximal tooth of the respective remaining three-dimensional digital tooth model, preserving of a minimum thickness of the respective remaining three-dimensional digital tooth model.

22. The method of claim 19, the adjustments of the geometric forms of the remaining three-dimensional digital tooth models comprising one or more of the following types of adjustments: a cutting of one or more sections of the geometric form of the respective remaining three-dimensional digital tooth model, a deforming of the geometric form of the respective remaining three-dimensional digital tooth model.

23. The method of claim 1, for each of the remaining three-dimensional tooth models a degree of the adjustments of the respective remaining three-dimensional digital tooth model being weighted based on a distance of the respective remaining three-dimensional digital tooth model for which the respective adjustment is calculated from the selected one or more three-dimensional digital tooth models.

24. The method of claim 1, the method further comprising:

generating a three-dimensional digital dental restoration model of the dental restoration to be manufactured using the adjusted three-dimensional digital teeth model provided for manufacturing the dental restoration, controlling a manufacturing of the dental restoration using the three-dimensional digital dental restoration model as template, the manufactured dental restoration being a physical copy of the template.

25. A computer program product for adjusting an arrangement of a plurality of three-dimensional digital tooth models for a dental restoration, the computer program product comprising a computer readable storage medium having program instructions embodied therewith, the program instructions being executable by a processor of a computer device to cause the computer device to:

receive a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receive a first input selecting one or more of the three-dimensional digital tooth models, receive a second input defining a modification of the selected one or more three-dimensional digital tooth models, modify the selected one or more three-dimensional digital tooth models according to the second input, while the selected one or more three-dimensional digital tooth models are modified according to the second input, automatically calculate adjustments of a geometric form of the selected one or more three-dimensional digital tooth models and automatically apply the calculated adjustments to the selected one or more three-dimensional digital tooth models, the adjustments being calculated in order to satisfy one or more first geometric criteria for the selected one or more three-dimensional digital tooth models, the adjustments of the geometric form of the selected one or more three-dimensional digital tooth models comprising one or more of the following: a deforming of the geometric form, a structural changing of the geometric form, automatically calculate adjustments of a set of remaining three-dimensional digital tooth models of the three-dimensional digital teeth model depending on the modification of the selected one or more three-dimensional digital tooth models, automatically apply the calculated adjustments to the remaining three-dimensional digital tooth models, provide the resulting adjusted three-dimensional digital teeth model for manufacturing the dental restoration.

26. A computer device for adjusting an arrangement of a plurality of three-dimensional digital tooth models for a dental restoration, the computer device comprising a processor and a memory storing program instructions executable by the processor, execution of the program instructions by the processor causing the computer device to:

receive a three-dimensional digital teeth model comprising the plurality of the three-dimensional digital tooth models, the three-dimensional digital teeth model defining an arrangement of a plurality of artificial teeth for the dental restoration, each of the three-dimensional digital tooth models defining an individual artificial tooth of the plurality of artificial teeth, receive a first input selecting one or more of the three-dimensional digital tooth models, receive a second input defining a modification of the selected one or more three-dimensional digital tooth models, modify the selected one or more three-dimensional digital tooth models according to the second input, while the selected one or more three-dimensional digital tooth models are modified according to the second input, automatically calculate adjustments of a geometric form of the selected one or more three-dimensional digital tooth models and automatically apply the calculated adjustments to the selected one or more three-dimensional digital tooth models, the adjustments being calculated in order to satisfy one or more first geometric criteria for the selected one or more three-dimensional digital tooth models, the adjustments of the geometric form of the selected one or more three-dimensional digital tooth models comprising one or more of the following: a deforming of the geometric form, a structural changing of the geometric form, automatically calculate adjustments of a set of remaining three-dimensional digital tooth models of the three-dimensional digital teeth model depending on the modification of the selected one or more three-dimensional digital tooth models, automatically apply the calculated adjustments to the remaining three-dimensional digital tooth models, provide the resulting adjusted three-dimensional digital teeth model for manufacturing the dental restoration.

27. A manufacturing system comprising the computer device of claim 26, the manufacturing system further comprising one or more manufacturing devices configured for manufacturing a dental restoration, execution of the program instructions by the processor further causing the computer device to generate a three-dimensional digital dental restoration model of the dental restoration to be manufactured using the adjusted three-dimensional digital teeth model provided for manufacturing the dental restoration, execution of the program instructions by the processor further causing the computer device to control the one or more manufacturing devices to manufacture the dental restoration using the three-dimensional digital dental restoration model as template, the manufactured dental restoration being a physical copy of the template.

* * * * *